(12) United States Patent
Hendricks et al.

(10) Patent No.: US 11,721,163 B2
(45) Date of Patent: Aug. 8, 2023

(54) CREDIT-SUBSTITUTION SYMBOL MECHANICS WITH REEL GROWTH FOR RANDOM BASED GAME OUTCOMES

(71) Applicant: Aristocrat Technologies, Inc., Las Vegas, NV (US)

(72) Inventors: Bradley Hendricks, Las Vegas, NV (US); Gary Penacho, Henderson, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/948,309

(22) Filed: Sep. 11, 2020

(65) Prior Publication Data

US 2022/0084350 A1 Mar. 17, 2022

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3244* (2013.01); *G07F 17/3267* (2013.01)

(58) Field of Classification Search
CPC ............. G07F 17/3213; G07F 17/3244; G07F 17/3267; G07F 7/588
See application file for complete search history.

(56) References Cited

U.S. PATENT DOCUMENTS

| | | | |
|---|---|---|---|
| 5,833,537 | A | 11/1998 | Barrie |
| 5,935,002 | A | 8/1999 | Falciglia |
| 7,237,775 | B2 | 7/2007 | Thomas |
| 7,445,547 | B2 | 11/2008 | Suzuki |

(Continued)

FOREIGN PATENT DOCUMENTS

AU 2019204175 2/2020

OTHER PUBLICATIONS

Office Action dated Aug. 12, 2021 for U.S. Appl. No. 16/948,308 (pp. 1-17).

(Continued)

*Primary Examiner* — Tramar Harper
*Assistant Examiner* — Jeffrey K Wong
(74) *Attorney, Agent, or Firm* — Weaver Austin Villeneuve & Sampson LLP

(57) ABSTRACT

A credit-substitution symbol mechanic for a gaming device is described. The credit-substitution symbol mechanic randomly triggers an add-substitution symbol feature in a game instance with an initial reel area and randomly determines an expanded reel size for a plurality of reels to be displayed in an expanded reel area. The credit-substitution symbol mechanic randomly determines a substitution symbol to be added to a first reel of the plurality of reels and randomly determines the substitution symbol is a credit-substitution symbol. The credit-substitution symbol mechanic determines that the credit-substitution symbol is part of a payline. The credit-substitution symbol mechanic performs a first payout for the payline that pays out a payline award and (Continued)

performs a second payout for the payline that pays out a credit value of the credit-substitution symbol.

20 Claims, 18 Drawing Sheets

(56) References Cited

U.S. PATENT DOCUMENTS

| | | |
|---|---|---|
| 7,780,519 B2 | 8/2010 | Gomez |
| 8,172,665 B2 | 5/2012 | Hoffman |
| 8,226,468 B2 | 7/2012 | Hoffman |
| 8,371,928 B2 | 2/2013 | Englman |
| 8,388,438 B2 | 3/2013 | Englman |
| 8,460,092 B1 | 6/2013 | Slomiany |
| 8,591,308 B2 | 11/2013 | Hoffman |
| 9,135,785 B2 | 9/2015 | Hoffman |
| 9,449,470 B2 | 9/2016 | Baerlocher |
| 9,530,287 B2 | 12/2016 | Hoffman |
| 9,564,006 B2 | 2/2017 | Ryan |
| 9,600,979 B2 | 3/2017 | Hornik |
| 9,640,025 B2 | 5/2017 | Saunders |
| 9,691,231 B2 | 6/2017 | Fujisawa |
| 9,824,527 B2 | 11/2017 | Evans |
| 9,836,915 B2 | 12/2017 | Meyer |
| 9,940,775 B2 | 4/2018 | Eaton |
| 10,152,845 B2 | 12/2018 | Pawloski |
| 10,388,112 B2 | 8/2019 | You |
| 10,403,093 B1 | 9/2019 | Halvorson |
| 10,410,477 B2 | 9/2019 | Hoffman |
| 11,625,975 B2 | 4/2023 | Jain et al. |
| 2003/0022712 A1 | 1/2003 | Locke |
| 2003/0092487 A1 | 5/2003 | Meyer |
| 2004/0033827 A1 | 2/2004 | Gilmore |
| 2004/0048646 A1 | 3/2004 | Visocnik |
| 2004/0053676 A1* | 3/2004 | Rodgers .................. G07F 17/34 463/20 |
| 2005/0059459 A1 | 3/2005 | Dunn |
| 2006/0189380 A1* | 8/2006 | Schultz .................. G07F 17/34 463/20 |
| 2007/0026923 A1 | 2/2007 | Muir |
| 2007/0060265 A1* | 3/2007 | Marks .................... G07F 17/32 463/16 |
| 2007/0238510 A1 | 10/2007 | Halprin |
| 2008/0242404 A1 | 10/2008 | Aoki |
| 2009/0325681 A1 | 12/2009 | Englman |
| 2010/0298041 A1 | 11/2010 | Berman |
| 2011/0045894 A1 | 2/2011 | Owen |
| 2011/0124405 A1* | 5/2011 | Okada ..................... G07D 7/12 463/43 |
| 2012/0202570 A1 | 8/2012 | Schwartz |
| 2014/0274284 A1 | 9/2014 | Leupp |
| 2015/0018070 A1 | 1/2015 | Meyer |
| 2015/0024826 A1 | 1/2015 | Ghaly |
| 2015/0087382 A1 | 3/2015 | Gilbertson |
| 2015/0087385 A1 | 3/2015 | Shiraishi |
| 2015/0094132 A1 | 4/2015 | Elias |
| 2015/0213672 A1 | 7/2015 | Elias |
| 2015/0339889 A1* | 11/2015 | Oropeza ............. G07F 17/3244 463/20 |
| 2015/0363999 A1* | 12/2015 | Little .................... G07F 17/326 463/20 |
| 2016/0093150 A1 | 3/2016 | Penacho |
| 2016/0203670 A1 | 7/2016 | Ford |
| 2016/0247361 A1* | 8/2016 | Meyer ................. G07F 17/3225 |
| 2017/0011582 A1* | 1/2017 | Fong ..................... G07F 17/34 |
| 2018/0025585 A1 | 1/2018 | Schmidt |
| 2018/0061176 A1* | 3/2018 | Berman ............. G07F 17/3213 |
| 2018/0130286 A1 | 5/2018 | Berman |
| 2018/0268659 A1 | 9/2018 | Chesworth |
| 2019/0139371 A1* | 5/2019 | Lamb .................. G07F 17/3244 |
| 2019/0206191 A1* | 7/2019 | Halvorson ............. G07F 17/34 |
| 2019/0287336 A1 | 9/2019 | Prabhu |
| 2019/0304255 A1 | 10/2019 | San |
| 2020/0051373 A1 | 2/2020 | Meyer |
| 2020/0111291 A1 | 4/2020 | Pariseau |
| 2020/0168053 A1 | 5/2020 | Berman |

OTHER PUBLICATIONS

Office Action dated Jan. 13, 2022 for U.S. Appl. No. 16/948,308 (pp. 1-6).
Office Action (Notice of Allowance and Fees Due (PTOL-85)) dated Jun. 7, 2022 for U.S. Appl. No. 16/948,308 (pp. 1-8).
Notice of Allowance dated Oct. 27, 2021 for U.S. Appl. No. 16/948,606 (pp. 1-8).
Aristocrat, Welcome to Fantastic Jackpots—Fantastic Cash, https://www.aristocrat.com/anz/games/welcome-to-fantastic-jackpots-fantastic-cash/, Aug. 2018.
Notice of Allowance dated Apr. 5, 2021 for U.S. Appl. No. 16/538,623 (pp. 1-9).
Notice of Allowance dated Aug. 31, 2021 for U.S. Appl. No. 16/948,606 (pp. 1-9).
Office Action dated Sep. 13, 2021 for U.S. Appl. No. 16/948,607 (pp. 1-16).
Office Action (Non-Final Rejection) dated Dec. 22, 2021 for U.S. Appl. No. 16/950,000 (pp. 1-16).
Notice of Allowance dated Feb. 9, 2022 for U.S. Appl. No. 16/948,606 (pp. 1-2).
Notice of Allowance dated Feb. 23, 2022 for U.S. Appl. No. 16/948,607 (pp. 1-9).
Office Action (Final Rejection) dated Jul. 5, 2022 for U.S. Appl. No. 16/950,000 (pp. 1-15).
Office Action (Notice of Allowance and Fees Due (PTOL-85)) dated Sep. 27, 2022 for U.S. Appl. No. 16/948,308 (pp. 1-8).
Office Action (Non-Final Rejection) dated Mar. 27, 2023 for U.S. Appl. No. 17/650,202 (pp. 1-8).

* cited by examiner

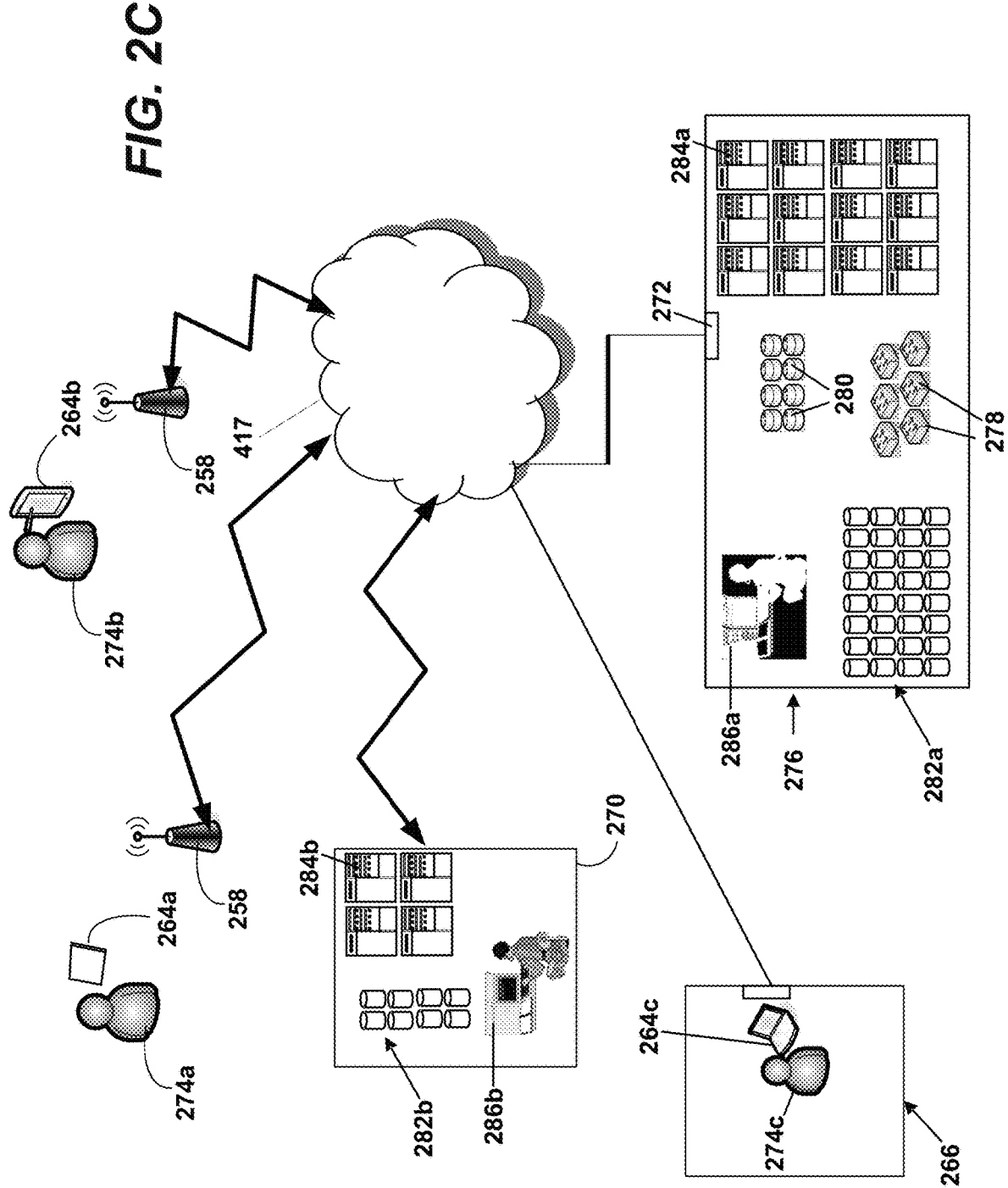

CREDIT-SUBSTITUTION SYMBOL MECHANICS WITH REEL GROWTH FOR RANDOM BASED GAME OUTCOMES

RELATED APPLICATION

This application is related to co-filed U.S. patent application Ser. No. 16/948,308, filed on Sep. 11, 2020, and titled "CREDIT-SUBSTITUTION SYMBOL MECHANICS FOR RANDOM BASED GAME OUTCOMES," which is hereby incorporated herein by referenced in its entirety.

BACKGROUND

The disclosure relates generally to the field of user interface (UI) design, electronic gaming devices, and electronic gaming software. More particularly, but not by way of limitation, this disclosure relates to performing gaming device operations that present and implement one or more credit-substitution symbol mechanics for random based game outcomes.

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary game features, and/or the amount awarded.

Typical games use a random number generator (RNG) to randomly determine the outcomes (also referenced throughout the disclosure as a "random based game outcome") for the games. Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs often depend on usability (e.g., ease of use and player understandability) and new or improved game features to enhance player experiences on the EGMs. Although previous EGMs include various UI features, game features, and backend game processing operations associated with the UI features to improve usability and enhance player experiences, there is a continuous need for further improvement to EGMs and other electronic gaming devices, electronic gaming software, and/or UI design.

SUMMARY

In one implementation, a system comprises memory and a processor operable to interact with the memory. The processor randomly triggers, based on a random number generator, an add-substitution symbol feature and randomly determines, based on the random number generator and triggering the add-substitution symbol feature, a number of substitution symbols to add to a first reel to be displayed in a reel area. The processor randomly determines, based on the random number generator, a substitution symbol from the number of substitution symbols added to the first reel is a credit-substitution symbol and determines that the credit-substitution symbol is part of a payline. The credit-substitution symbol substitutes as a different symbol type when forming the payline. The processor performs a first payout for the payline that pays out a payline award and performs a second payout for the payline that pays out a credit value of the credit-substitution symbol.

In another implementation, a system comprises memory and a processor operable to interact with the memory. The processor presents triggering an add-substitution symbol feature and presents a number of substitution symbols to add to a first reel to be displayed in a reel area. The processor presents a substitution symbol from the number of substitution symbols added to the first reel is a credit-substitution symbol and presents that the credit-substitution symbol is part of a payline. The credit-substitution symbol substitutes as a different symbol type when forming the payline. The processor presents an animation of a first payout for the payline that pays out a payline award and a second payout for the payline that pays out a credit value of the credit-substitution symbol.

In another implementation, a method is described to implement a credit-substitution symbol mechanic. The method randomly triggers, based on a random number generator, an add-substitution symbol feature and randomly determines, based on the random number generator and triggering the add-substitution symbol feature, a number of substitution symbols to add to a first reel to be displayed in a reel area. The method randomly determines, based on the random number generator, a substitution symbol from the number of substitution symbols added to the first reel is a credit-substitution symbol and determines that the credit-substitution symbol is part of a payline. The credit-substitution symbol substitutes as a different symbol type when forming the payline. The method performs a first payout for the payline that pays out a payline award and performs a second payout for the payline that pays out a credit value of the credit-substitution symbol.

In another implementation, a method is described to implement a credit-substitution symbol mechanic. The method presents triggering an add-substitution symbol feature and presents a number of substitution symbols to add to a first reel to be displayed in a reel area. The method presents a substitution symbol from the number of substitution symbols added to the first reel is a credit-substitution symbol and presents that the credit-substitution symbol is part of a payline. The credit-substitution symbol substitutes as a different symbol type when forming the payline. The method presents an animation of a first payout for the payline that pays out a payline award and a second payout for the payline that pays out a credit value of the credit-substitution symbol.

In another implementation, a system comprises memory and a processor operable to interact with the memory. The processor randomly triggers, based on a random number generator, an add-substitution symbol feature in a game instance with an initial reel area and randomly determines, based on the random number generator and triggering the add-substitution symbol feature, an expanded reel size for a plurality of reels to be displayed in an expanded reel area, wherein the expanded reel area is larger than the initial reel rea. The processor randomly determines, based on the random number generator and triggering the add-substitution symbol feature, a substitution symbol to be added to a first reel of the plurality of reels and randomly determines, based on the random number generator, the substitution symbol is a credit-substitution symbol. The processor determines that the credit-substitution symbol is part of a payline, where the credit-substitution symbol substitutes as a different symbol type when forming the payline. The processor performs a first payout for the payline that pays out a payline award and performs a second payout for the payline that pays out a credit value of the credit-substitution symbol.

In another implementation, a system comprises memory and a processor operable to interact with the memory. The processor presents triggering an add-substitution symbol feature in a game instance with an initial reel area and an expanded reel size for a plurality of reels to be displayed in an expanded reel area, where the expanded reel area is larger than the initial reel rea. The processor presents a substitution symbol to be added to a first reel of the plurality of reels and presents that the substitution symbol is a credit-substitution symbol. The processor presents that the credit-substitution symbol is part of a payline, where the credit-substitution symbol substitutes as a different symbol type when forming the payline. The processor presents a first payout for the payline that pays out a payline award and presents a second payout for the payline that pays out a credit value of the credit-substitution symbol.

In another implementation, a method is described to implement a credit-substitution symbol mechanic. The method randomly triggers, based on a random number generator, an add-substitution symbol feature in a game instance with an initial reel area and randomly determines, based on the random number generator and triggering the add-substitution symbol feature, an expanded reel size for a plurality of reels to be displayed in an expanded reel area, wherein the expanded reel area is larger than the initial reel rea. The method randomly determines, based on the random number generator and triggering the add-substitution symbol feature, a substitution symbol to be added to a first reel of the plurality of reels and randomly determines, based on the random number generator, the substitution symbol is a credit-substitution symbol. The method determines that the credit-substitution symbol is part of a payline, where the credit-substitution symbol substitutes as a different symbol type when forming the payline. The method performs a first payout for the payline that pays out a payline award and performs a second payout for the payline that pays out a credit value of the credit-substitution symbol.

In another implementation, a method is described to implement a credit-substitution symbol mechanic. The method presents triggering an add-substitution symbol feature in a game instance with an initial reel area and an expanded reel size for a plurality of reels to be displayed in an expanded reel area, where the expanded reel area is larger than the initial reel rea. The method presents a substitution symbol to be added to a first reel of the plurality of reels and presents that the substitution symbol is a credit-substitution symbol. The method presents that the credit-substitution symbol is part of a payline, where the credit-substitution symbol substitutes as a different symbol type when forming the payline. The method presents a first payout for the payline that pays out a payline award and presents a second payout for the payline that pays out a credit value of the credit-substitution symbol.

In one or more implementations, each of the above described methods, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

FIG. 2C is a diagram that shows examples of components of a system for providing online gaming according to some aspects of the present disclosure.

DETAILED DESCRIPTION

Figure 1:
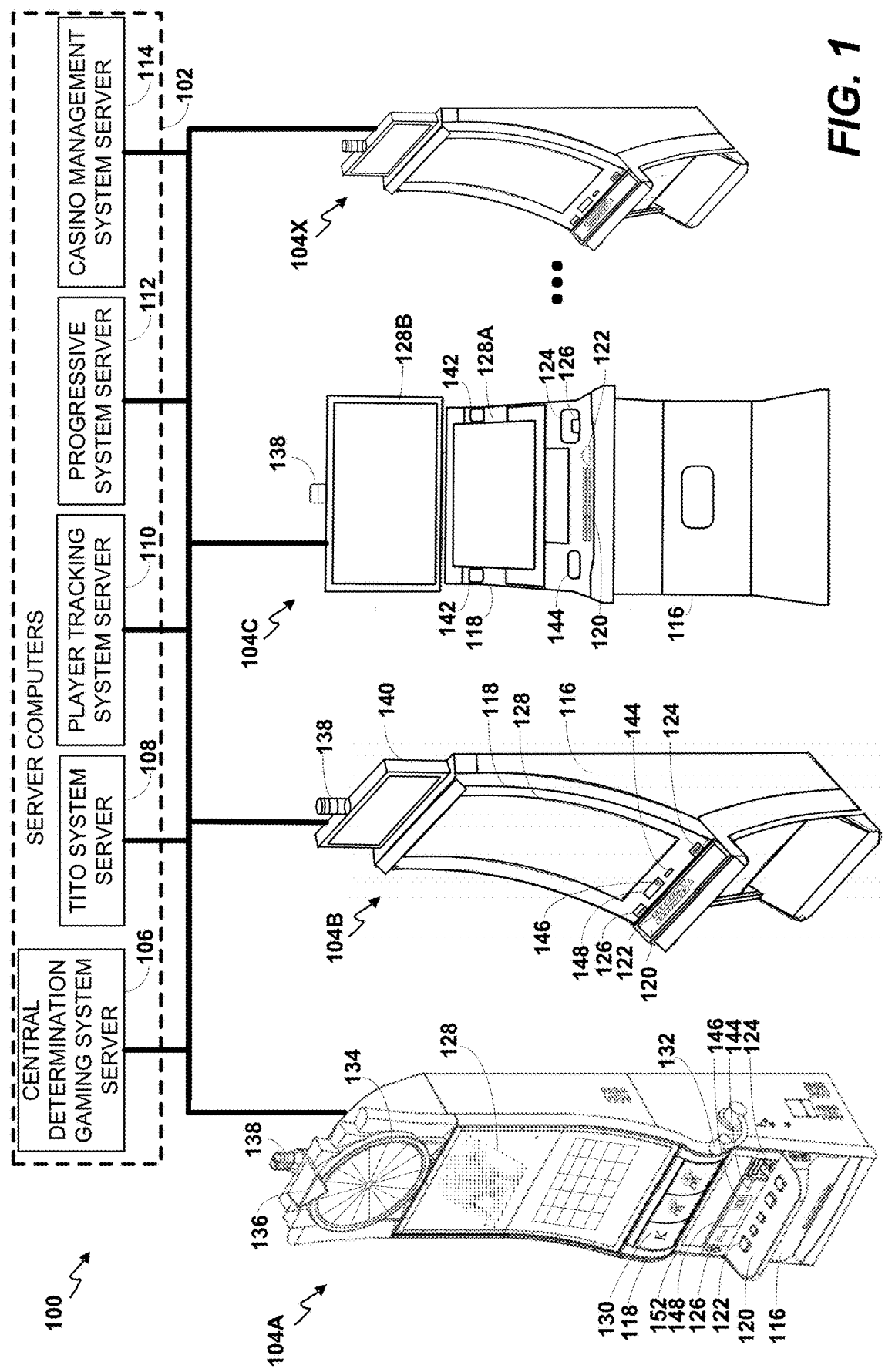
FIG. 1 is an exemplary diagram showing several EGMs networked with various gaming related servers.

The disclosure includes various example implementations that generate random based game outcomes according to one or more credit-substitution symbol mechanics. In one or more implementations, a gaming device generates one or more credit-wild symbols (also referenced throughout this disclosure as "credit-substitution symbols") in one or more add-substitution symbol supplemental features (e.g., a special mode, secondary game, or bonus game). In a base game and/or supplemental game feature (e.g., a free games bonus feature), the gaming device randomly determines whether to trigger the add-substitution symbol supplemental feature. After entering the add-substitution symbol supplemental feature, the gaming device adds wild symbols (also referenced throughout this disclosure as "substitution symbols") to a displayed reel area with a given reel configuration, such as a 5×4 reel configuration. The displayed reel area for the add-substitution symbol supplemental feature has the same reel configuration and reel size as the base game and/or supplemental game feature. Stated another way, the add-substitution symbol supplemental feature does not include a reel growth operation.

When adding wild symbols, the gaming device performs a random substitution determination operation that randomly adds plain-wild symbols (also generally referred throughout this disclosure as "plain-substitution symbols") and/or credit-wild symbols (also generally referred throughout this disclosure as "credit-substitution symbols") to the displayed reel area. To perform the random substitution determination operation, the gaming device determines the number of wild symbols that land on each reel in the displayed reel area. The gaming device also randomly determines which set of substitution volatility lookup tables to use when determining whether to add plain-wild symbols. For example, the gaming device can have two sets of substitution volatility lookup tables. One set is configured to generate credit-wild symbols at a relatively lower rate than a second set of substitution volatility lookup tables. Each set of substitution volatility lookup tables includes a separate substitution volatility lookup table for each reel displayed in the reel area. After randomly selecting one set of substitution volatility lookup tables and determining the number of wild symbols to add to each reel, the gaming device uses the appropriate substitution volatility lookup table to randomly determine whether each added wild symbol for a given reel should be plain-wild symbol or credit-wild symbol. For each credit-wild symbol added to the displayed reel area, the gaming device randomly determines the credit values using a credit volatility lookup table associated with a given reel. The gaming device could also use a separate credit volatility lookup table for each reel shown in the displayed reel area. Any win line that contains a credit-wild symbol will pay the amount shown on the credit-wild symbol in addition to the payline award.

Additionally, or alternatively, the gaming device can perform a credit-substitution symbol mechanic that includes a reel growth operation in one or more add-substitution symbol supplemental features. In one or more implementations, an add-substitution symbol supplemental feature could be a single spin with a reel growth operation. After entering the add-substitution symbol supplemental feature, the gaming device randomly adds wild symbols to a displayed reel area that randomly expands its reel size. For example, the displayed reel area could initially have a 5×4 reel configuration in a base game. When performing the spin in the supplemental game feature, the reel configuration could vertically expand to a 5×10 reel configuration. To account for a target game RTP and the reel growth operation, the gaming device performs a reel growth, substitution determination operation that randomly adds plain-wild symbols and/or credit-wild symbols to certain reels in the displayed reel area. As an example, the gaming device could potentially add plain-wild symbols to all reels in the displayed reel area and credit-wild symbols to a designated subset of the reels, such as reels positioned in columns 3-5 of the displayed reel area.

To implement a reel growth, substitution determination operation, the gaming device accounts for adding wild symbols to the expanded portion of the reel area. To perform the reel growth, substitution determination operation, the reel growth, substitution determination operation randomly determines the reel size (e.g., up to 14 rows added to the reel area) and whether to add plain-wild symbols or credit-wild symbols to a given reel. The gaming device could also have a designated minimum number of reels that will have at least one wild symbol added to the reels (e.g., two reels with at least one wild symbol added). After determining the reel size and whether plain-wild symbols or credit-wild symbols are added to a given reel, the gaming device determines which symbol window positions to add wild symbols for the given reel. If the gaming device determines that credit-wild symbols will be added to one or more reels, the gaming device utilizes one or more credit volatility lookup tables that dynamically determine the range of the credit values assigned for credit symbols (e.g., low, medium, or high game credit values). In one or more implementations, the gaming device can also have a designated minimum number of wild symbols that should be added to a given reel (e.g., two wild symbols per reel) based on the reel size. For example, the designated minimum number of wild symbols could be set to add two wild symbols to each reel when the reel area grows to a 5×7 reel configuration. In comparison, if the reel area grows to a 5×14 reel configuration, the designated minimum number of wild symbols could be set to add four wild symbols to each reel.

In one or more implementations, the add-substitution symbol supplemental feature can add wild symbols to a displayed reel area that grows over multiple spins. For example, the add-substitution symbol supplemental feature can be incorporated into a supplemental game feature, such as a free games bonus feature. To implement a reel growth, substitution determination operation in the supplemental game feature, the gaming device adds wild symbols to a reel area that randomly grows over multiple spins. The gaming device can randomly determine which spins in a set of initial spins will add wild symbols and the reel size for each spin. For the spins that will add wild symbols, the gaming device randomly determines whether to add plain-wild symbols or credit-wild symbols to a given reel based on the designated minimum number of reels that will have at least one wild symbol added. The gaming device will also randomly and separately determine the reel size for each spin. After determining the reel size and whether plain-wild symbols or credit-wild symbols are added to a given reel, the gaming device randomly determines which symbol window positions to add wild symbols for the given reel.

In terms of technical effects, the credit-substitution symbol mechanics described throughout the disclosure delivers improvements to electronic gaming software, UI design, and/or gaming devices by providing new and/or improved gaming device operations that comply with gaming regulations. For example, the use of credit-substitution symbol mechanics provides multiple payout operations when a credit-wild symbol is part of a payline. Specifically, the gaming device performs one payout operation for the payline award and another payout operation for the credit value of the credit-wild symbol. In contrast, other implementations that include a plain-wild symbol generally perform a single payout operation that credits the payline award to a player. The number of payout operations that pays out the credit value of the credit-wild symbol depends on the number of paylines that credit-wild symbol is part of. As an example, if a credit-wild symbol is part of four different paylines, the credit value of the credit-wild symbol is paid out four times. Performing multiple payout operations for a credit-wild symbol, enlarging a reel area, and randomly adding credit-wild symbols to a reel area are operations that increase game volatility through increasing the payout potential earned from a single spin or over multiple spins. The disclosed credit-wild symbol mechanics, thus, increase game volatility while ensuring game randomness, a target game RTP (e.g., an overall game RTP of 90%), and compliance with other regulatory constraints. These and other technical features are described in greater detail later in the disclosure.

Example Electronic Gaming Devices and Gaming Environments

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
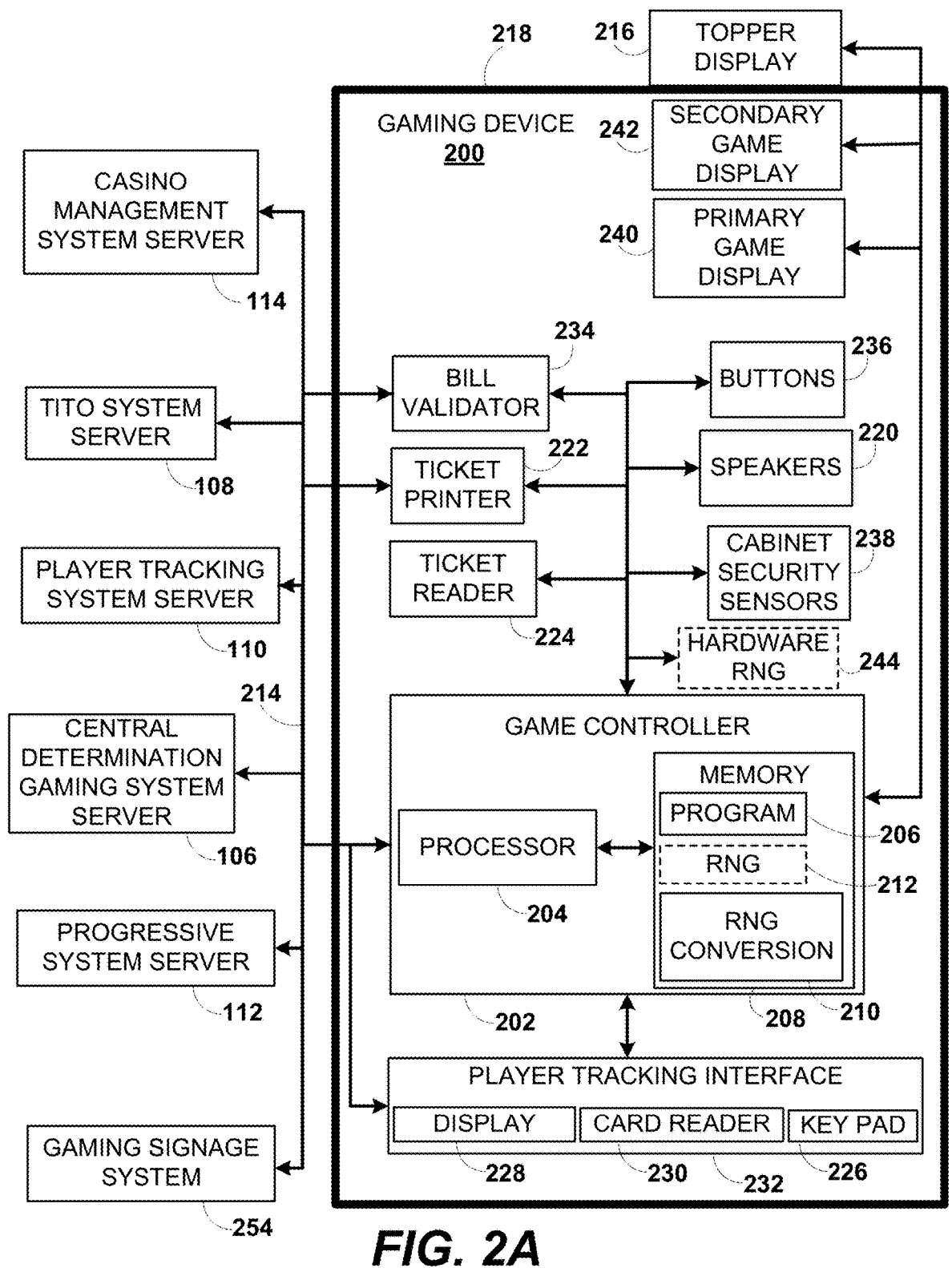
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify, and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. Similar to FIG. 1, gaming device 200 can be specially configured to generate random based game outcomes using a repeat accrual meter mechanic. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
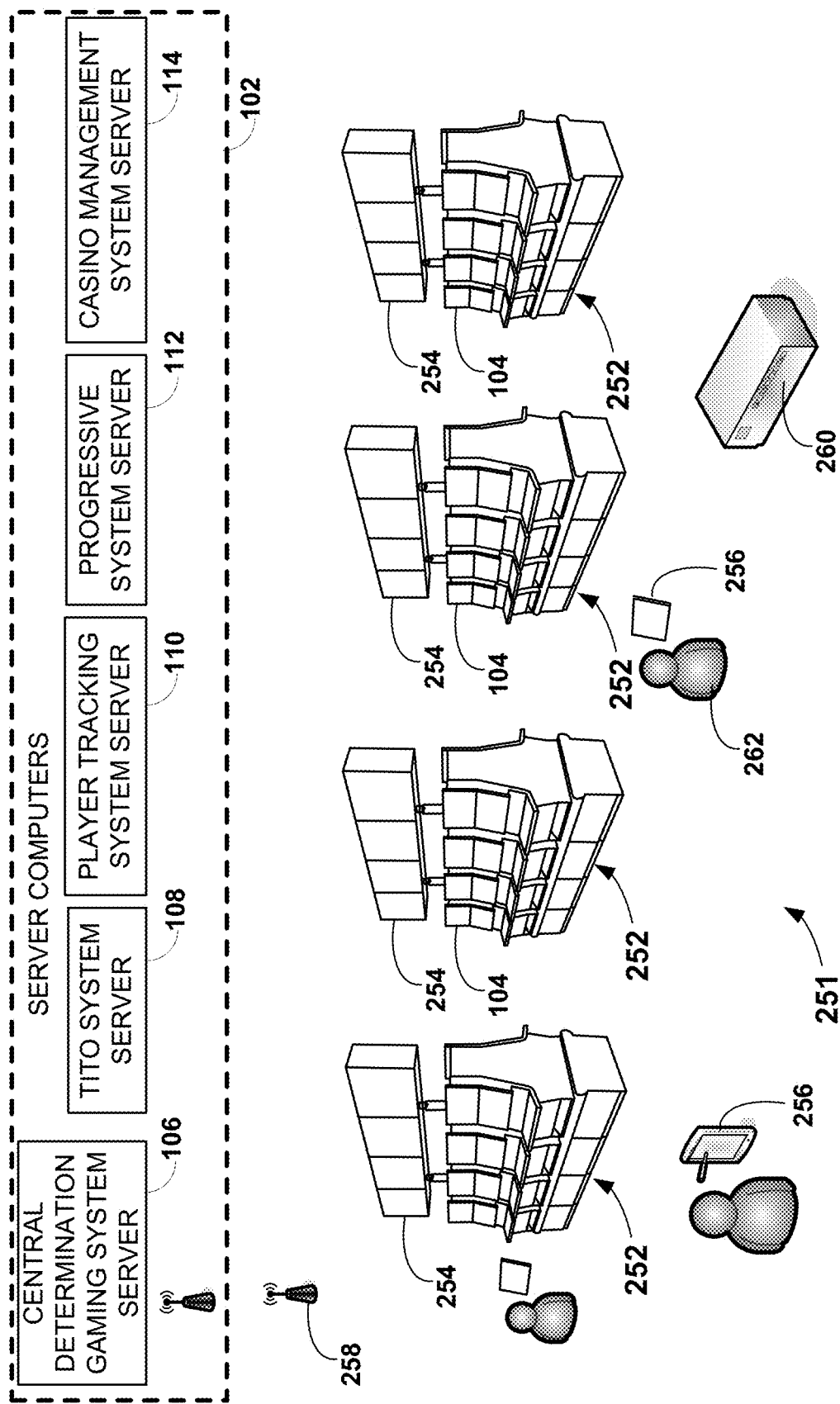
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones, dedicated gaming consoles, and/or other handheld or portable devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Example Game Processing Architecture

Figure 3:
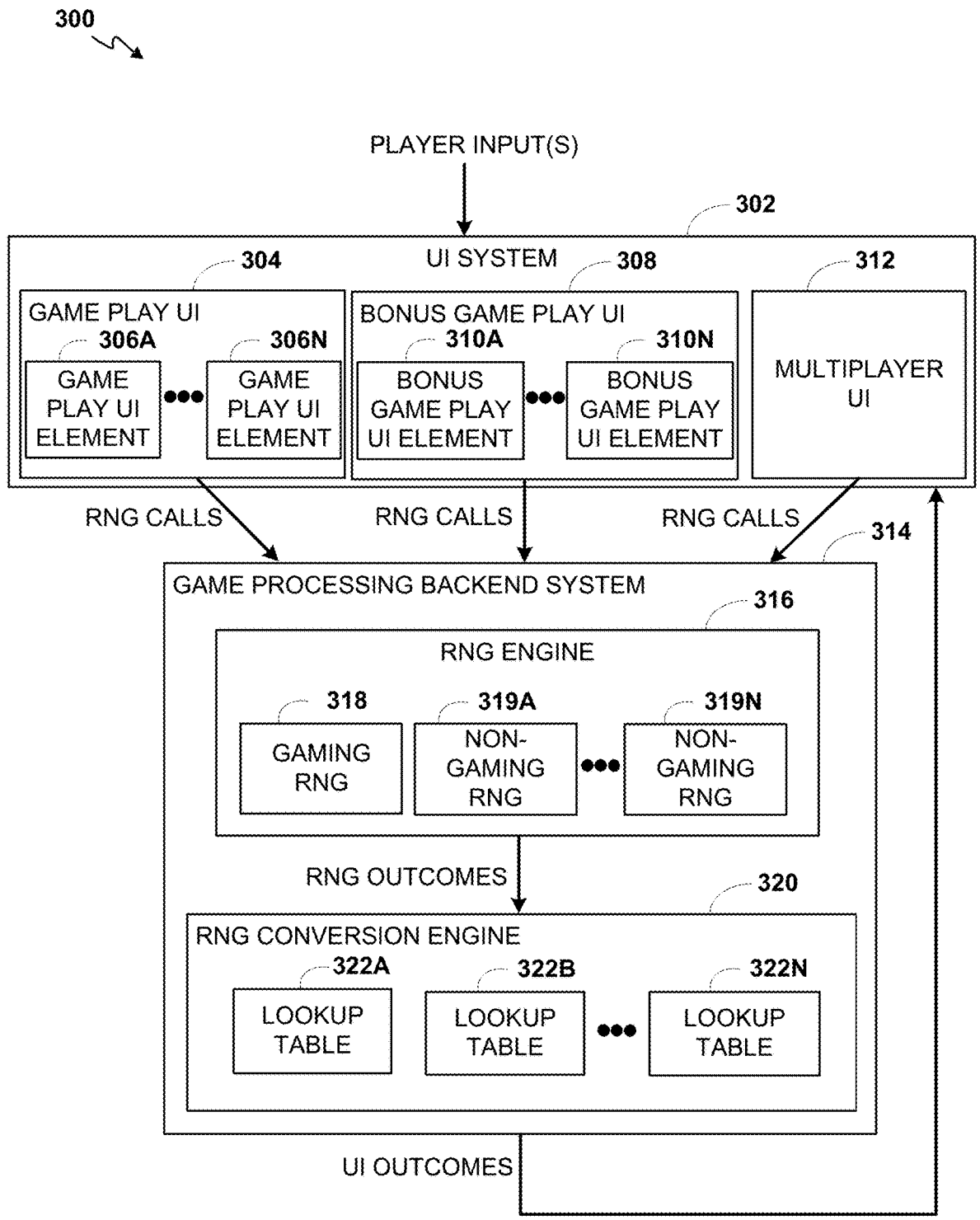
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes, for example random numbers. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

For a reel game, the game play UI 304 and/or bonus game play UI 308 includes a reel area that encloses viewable portions of a set of reels associated with the reel area. For each reel strip, the viewable portion of the reel strips includes one or more positions for symbols (also referenced throughout the disclosure as "symbol window positions"). Thus, the reel area is a matrix of symbols on a UI and may be highlighted to emphasize reel strips and symbols within the reel area. The number of reel strips and dimensions of the reel area depend on implementation. In some typical configurations, a reel area has an m×n configuration, with m reels and with n symbols visible per reel. For example, for a base reel game, a reel area can have a 5×3 configuration—five reels per window, with three symbols showing in the window for each of the reels. More generally, the reel area spans m reels in a first dimension and spans n symbols in a second dimension orthogonal to the first dimension, where the value of m can be 4, 5, 6, 7, 8, or some other number of reels, and the value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Alternatively, a reel area can have another configuration. For example, a reel area can have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel), or as further explained below, a reel area can have a p×q configuration, with p×q reels visible in a rectangular reel area, and a single symbol visible per reel.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. As an example, in a reel game, to determine the random base game outcome, the RNG conversion engine 320 includes reel strips that vary in symbol pattern and reel strip length. Each reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game can change dynamically after the reel game boots (e.g., depending on bet level or some other factor). Different sets of reels can be used for a base reel game and bonus reel game (or other supplemental game feature such as a special mode of the base reel game). For example, for a special mode of a base reel game, more "valuable" symbols, such as wild symbols or scatter symbols, can be added to the reels of a base reel game or swapped in for other symbols on the reels.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

In one or more implementations, for a given lookup table 322, the probabilities for different options can be reflected in table entry values (e.g., for a random number RND associated with a RNG outcome, generated by an RNG, in the range of 0<RND<=40 for option 1, 40<RND<=70 for option 2, 70<RND<=90 for option 3, and 90<RND<=100 for option 4, given four options and a random number RND where 0<RND<=100). The table entry values can represent percentages or, more generally, sub-ranges within the range for a random number. In some implementations, the table entry values for a lookup table 322 are represented as count values (which can also be referend throughout the disclosure as "weights") for the respective entries of the lookup table. As an example, the following table shows count values for the four options described above:

TABLE 1

Example Lookup Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Game processing backend system 314 can use a random number for an RNG outcome, generated between 1 and the sum total of the count values, to select one of the entries in the lookup table 322 by comparing the random number to successive running totals. In the example shown in Table 1, if the random number for the RNG outcome is 40 or less, the RNG conversion engine 320 selects the first entry. Otherwise, if the random number for the RNG outcome is between 41 and 70, RNG conversion engine 320 selects the second entry. Otherwise, if the random number for the RNG outcome is between 71 and 90, the RNG conversion engine 320 selects the third entry. Otherwise, the RNG conversion engine 320 selects the last entry. The table entry values for a lookup table 322 can be fixed and predetermined, can vary dynamically (e.g., depending on bet level), or can be dynamically selected (e.g., depending on bet level, depending on another factor) from among multiple available lookup tables. Different game parameters or choices during game play can use different lookup tables 322, or different combinations of game parameters or choices can be combined in entries of a given lookup table 322.

In general, after the reel strips have landed to produce a random based game outcome (also referenced throughout the disclosure as "reel stops"), game processing backend system 314 identifies any win conditions and any win amounts to award to the player (e.g., credited to the player's credit balance). In some examples, win conditions depend on a count of credit symbols that land after the reel stops. In other examples, win conditions are defined as paylines (also called win lines) across at least a portion of a reel area on a display screen. For a round of play, game processing backend system 314 awards a win amount when a certain combination of symbols appears along a payline. Win amounts can vary according to the combination of symbols and according to the particular payline along which the combination of symbols land. In one or more implementations, instead of evaluating win conditions on paylines across reels, game processing backend system 314 can determine an award according to a "ways" approach. Game processing backend system 314 typically determines the win amounts according to a pay table, where the pay table comprehends the various combinations of symbols and/or paylines that may occur (e.g., the win conditions). The win amount for a round of play may be a fraction of an amount wagered for that round of play for certain win conditions.

For other win conditions, the win amount may be much larger than the amount wagered.

After generating the UI outcome, game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300.

Credit-Substitution Symbol Mechanics for Nonexpanding Reels

For purpose of this disclosure, the term "substitution symbol" refers to any symbol type that can be substituted for and/or act as one or more other symbol types when determining a pay evaluation. Examples of substitution symbols include plain-substitution symbols, credit-substitution symbols, and multiplier-substitution symbols, all of which can also be generally referenced as "wild symbols." The term "plain-substitution symbol" refers to a generic, substitution symbol type that substitutes for one or more other symbol types and is not associated with multiple payout operations. Specifically, a plain-substitution symbol that substitutes for another symbol type to form a payline does not trigger an additional payout operation, but could trigger an upgrade operation, bonus operation, or some other operation that provides an additional game benefit. The term "credit-substitution symbol" refers to a substitution symbol type with an assigned and/or determined credit value. In one or more implementations, a credit-substitution symbol can trigger payout of the credit value in addition to a payline award when the credit-substitution symbol substitutes as another symbol type to form a payline. The term "multiplier-substitution symbol" refers to a substitution symbol type with an assigned and/or determined multiplier value. In one or more implementations, the multiplier-substitution symbol triggers multiplying the payline award based on the multiplier value when the multiplier-substitution symbol is part of the payline. The term "add-substitution symbol supplemental feature" refers to a supplemental game feature that adds substitution symbols to different symbol window positions in a displayed game area (e.g., reel area) over one or more game instances.

With reference to FIG. 3, to implement one or more credit-substitution symbol mechanics, the UI system 302 starts off by presenting a base game to a player using game play UI 304. In a slot game context, game play UI 304 includes a reel area with a set of reels, where each reel contains multiple symbol window positions. After a player sets a wagering amount and initiates a game instance (can also be referred to within this disclosure as a "round of play" or for a slot game context as a "spin"), game play UI 304 presents to a player a random based game outcome. For one or more game instances, rather than displaying the random based game outcome for the base game, game play UI 304 randomly transition to bonus game play UI 308 to show an add-substitution symbol supplemental feature. The bonus game play UI 308 can present the add-substitution symbol supplemental feature in a single game instance or over multiple game instances. When presenting the add-substitution symbol supplemental feature, the bonus game play UI 308 adds one or more substitution symbols (e.g., credit-substitution symbols and/or plain-substitution symbols) at one or more symbol window positions in the displayed reel area. Bonus game play UI 308 can present the addition of substitution symbols using one or more animations that can occur when one or more reels are spinning or after the reels stop and before any payout animation occurs.

In one or more implementations, the UI system 302 can also present an add-substitution symbol supplemental feature within a supplemental game feature (e.g., a free games bonus feature) using bonus game play UI 308. Similar to game play UI 304, in a slot game context, bonus game play UI 308 includes a reel area with a set of reels, where each reel contains multiple symbol window positions. For one or more game instances in the supplemental game feature, bonus game play UI 308 randomly presents the add-substitution symbol supplemental feature by placing one or more substitution symbols (e.g., credit-substitution symbols and/or plain-substitution symbols) at one or more symbol window positions in the displayed reel area. Bonus game play UI 308 depicts the addition of substitution symbols using one or more animations that can occur when one or more reels are spinning or after the reels stop and before any payout animation occurs.

To support presenting the add-substitution symbol supplemental feature within UI system 302, game processing backend system 314 randomly determines whether to trigger the add-substitution symbol supplemental feature within a base game and/or supplemental game feature. In one example, game processing backend system 314 triggers the add-substitution symbol supplemental feature based on the random based game outcome in the base game and/or supplemental game feature. In another example, game processing backend system 314 performs an RNG pull from a lookup table 322 (e.g., lookup table 322A) to trigger the add-substitution symbol supplemental feature. For this example, the RNG pull is separate and independent from the RNG pulls that generate the random based game outcome in the base game and/or supplemental game feature. The lookup table 322 (e.g., lookup table 322A) maps the RNG outcome to a game evaluation that determines whether to trigger the add-substitution symbol supplemental feature. Table 2, which is shown below, provides an example lookup table 322 for randomly determining whether to trigger the add-substitution symbol supplemental feature.

TABLE 2

Example Lookup Table for Triggering an Add-Substitution Symbol Supplemental Feature

| Count Value | Triggering Event |
|---|---|
| 300 | Do Not Trigger a Add-substitution symbol supplemental feature |
| 1 | Trigger Add-substitution symbol supplemental feature |

As shown in Table 2, game processing backend system 314 is more likely to not trigger the add-substitution symbol supplemental feature based on the 300 count value (also referred to as the weighted value). By setting the count values according to Table 2, game processing backend system 314 can maintain a target game RTP since the add-substitution symbol supplemental feature, on average, provides a higher payout than game instances in a base game and/or supplemental game feature.

After determining to trigger the add-substitution symbol supplemental feature, game processing backend system 314 performs a random substitution determination operation. As part of the random substitution determination operation, game processing backend system 314 randomly determines the number of substitution symbols that should be assigned to symbol window positions in a displayed gaming area. In a slot game context, the displayed gaming area is a reel area with one or more reels, where each reel includes multiple symbol window positions. For each reel, game processing backend system 314 performs a separate RNG pull from a lookup table 322 (e.g., lookup table 322B) to randomly determine the number of substitution symbols to add to each reel. For example, if the reel area has five reels, then game processing backend system 314 performs five separate RNG pulls to determine the number of substitution symbols to add for each reel. Specifically, game processing backend system 314 performs one RNG pull for the reel positioned in column 1, a second RNG pull for the reel positioned in column 2, a third RNG pull for reel positioned in column 3, a fourth RNG pull for the reel positioned in column 4, and a fifth RNG pull for the reel positioned in column 5. The five separate RNG pulls could be from a single lookup table 322 (e.g., lookup table 322B) or from multiple lookup tables 322 (e.g., separate lookup tables 322B-322F for each reel). By using multiple lookup tables 322 (e.g., lookup tables 322B-322F), game processing backend system 314 could provide a finer granularity of game volatility control when compared to using a single lookup table 322.

In one or more implementations, game processing backend system 314 performs a random substitution determination operation that directly determines the number of substitution symbols to add to a given reel. Table 3, which is shown below, provides an example lookup table 322 (e.g., lookup table 322B) for directly determining the number of substitution symbols to add for one or more reels. As shown in Table 3, for a given RNG pull, game processing backend system 314 maps an RNG outcome to the number of substitution symbols to add to a given reel.

TABLE 3

Example Lookup Table for Determining the
Number of Substitution Symbols to Add

| Count Value | Number of Substitution Symbols to Add |
|---|---|
| 10 | 0 |
| 50 | 1 |
| 10 | 2 |
| 5 | 3 |
| 1 | 4 |

In Table 3, game processing backend system 314 is most likely to add one substitution symbol to a reel based on the count value of 50. Game processing backend system 314 is least likely to add four substitution symbols based on the count value of one. With reference to Table 3, in a 5×4 reel configuration, four is the maximum number of substitution symbols to add since each reel has a maximum number of four symbol window positions. In other implementations Table 3, could be weighted differently to be more likely to add a different number of substitution symbols. As an example, Table 3 could be constructed to provide a count value of 50 for adding two substitution symbols and a count value of 10 for adding one substitution symbol. The count values set within Table 3 allows game processing backend system 314 to maintain a target game RTP and/or achieve a certain game volatility.

After determining the number substitution symbols to add to each reel, as part of the random substitution determination operation, game processing backend system 314 also randomly determines and assigns symbol window positions for the added substitution symbols. In one or more implementations, game processing backend system 314 performs an RNG pull from a lookup table 322 (e.g., lookup table 322G) to randomly determine symbol window positions for the added substitution symbols. The lookup table maps an RNG outcome to an available symbol window position for a given reel. As an example, lookup table 322 (e.g., lookup table 322G) could map the RNG outcome to four different symbol window positions in the left most reel (e.g., column 1) in the reel area. Based on the RNG pull, game processing backend system 314 randomly determines the symbol window position for the given reel and assigns the substitution symbol to the determined symbol window position. Afterwards, for the given reel, game processing backend system 314 removes the symbol window position from the list of available symbol window positions. Continuing with the example above, after determining that the top most symbol window position in the left most reel should receive an added substitution symbol, game processing backend system 314 removes the top most symbol window position at the left most reel from the list of available symbol window positions. When determining where to assign the next substitution symbol, game processing backend system 314 randomly selects from the three other available symbol window positions in the left most reel and assigns and/or places the added substitution symbol to the determined symbol window position. By removing unavailable symbol window positions, game processing backend system 314 avoids determining and assigning a substitution symbol at a symbol window position that already has been designated to receive an added substitution symbol.

In one or more implementations, game processing backend system 314 performs a random substitution determination operation that uses one or more lookup tables 322 to indirectly determine the number of substitution symbols to add to a given reel. Rather than determining the number of substitution symbols to add to a given reel, game processing backend system 314 randomly determines which symbol window positions will receive added substitution symbols. Based on the lookup tables 322, game processing backend system 314 randomly determines for each symbol window position whether to add a substitution symbol. In other words, game processing backend system 314 does not assign a symbol window position for a substitution symbol. Rather, for each symbol window position, game processing backend system 314 performs a separate RNG pull from lookup tables 322 that maps an RNG outcome to determine whether to add substitution symbols. Afterwards, for each reel, game processing backend system 314 counts the number of symbol window positions with added substitution symbols to indirectly determine the number of substitution symbols added to a given reel. Examples of indirectly determining the number of substitution symbols to add to a given reel is discussed later in the disclosure with respect to the reel growth, substitution determination operation.

Referring to FIG. 3, lookup tables 322 can also include one or more sets of substitution volatility lookup tables. After game processing backend system 314 determines to trigger the add-substitution symbol supplemental feature, game processing backend system 314 also randomly determines which set of substitution volatility lookup tables to use when determining the substitution symbol types for the added substitution symbols. For example, the substitution symbols could be plain-substitution symbols, credit-substitution symbols, and/or other multiplier-substitution symbols. Having multiple sets of substitution volatility lookup tables increases the volatility of when credit-substitution symbols and/or other substitution symbol types will land in the add-substitution symbol supplemental feature. As an example, the gaming device can have two sets of substitution volatility lookup tables, a first set of substitution volatility lookup tables that randomly selects credit-substitution symbols at a relatively higher rate than a second set of substitution volatility lookup tables. In particular, when selecting the first set of volatility lookup tables, game processing backend system 314 could generate, on average, five credit-substitution symbols. In contrast, by selecting the second set of volatility lookup tables, game processing backend system 314 could generate, on average, one credit-substitution symbol. Recall that generating more credit-substitution symbols could increase game volatility by increasing the payout for each payline.

Each set of substitution volatility lookup tables includes a separate substitution volatility lookup table assigned to each reel displayed in the reel area. For example, the left most reel (e.g., reel in column 1 of the reel area) could have a substitution volatility lookup table that is separate and independent of the substitution volatility lookup tables for one or more other reels (e.g., reels in columns 2-5 of the reel area). Each substitution volatility lookup table could have different weights assigned to credit-substitution symbols, plain-substitution symbols, and/or other substitution symbol types. After randomly selecting one set of substitution volatility lookup tables and determining the number of substitution symbols to add to each reel, game processing backend system 314 uses the assigned substitution volatility lookup table to randomly determine whether each added substitution symbol for a given reel should be plain-substitution symbol, credit-substitution symbol, or other substitution symbol type.

One or more lookup tables 322 in FIG. 3 could also be credit volatility lookup tables. For each credit-substitution symbol added to the displayed reel area, game processing backend system 314 randomly determines the credit values using a credit volatility lookup table associated with a given reel. In other words, game processing backend system 314 uses a separate credit volatility lookup table for each reel shown in the displayed reel area. As an example, reel in column 1 would be assigned to one credit volatility lookup table, reel in column 2 would be assigned to a second credit volatility lookup table, reel in column 3 would be assigned to a third credit volatility lookup table, and so forth. By having separate credit volatility lookup tables for each reel, game processing backend system 314 can vary the credit values that land across different reels. For example, the credit volatility lookup tables are constructed such that, on average, higher credit values land on the reel in column 5 when compared to the other reels at other columns in the reel area. Additionally, or alternatively, reel in column 1 could also, on average, have lower credit values land when compared to the other reels. Other implementations could utilize other credit volatility lookup tables that dynamically determine the range of the credit values assigned for credit symbols (e.g., low, medium, or high game credit values).

As part of the add-substitution symbol supplemental feature, game processing pipeline 300 initiates multiple RNG calls to determine the random based game outcome for the add-substitution symbol supplemental feature. For example, if the add-substitution symbol supplemental feature includes five reels, game processing pipeline 300 initiates a total of five RNG calls, one RNG call for each reel, to game processing backend system 314 to determine the reel stop for each reel. Subsequently, game processing backend system 314 adds substitution symbols (e.g., credit-substitution symbols and/or plain-substitution symbols) over the random based game outcome at the appropriate symbol window positions. In other words, for each added substitution symbol, game processing backend system 314 replaces a symbol and/or combines the symbol attributes of the symbol generated from the random based game outcome and the added substitutions symbol. As an example, game processing backend system 314 can replace a variety of picture or royal symbols generated from the random based game outcome with the added substitution symbol. In another example, when game processing backend system 314 adds a substitution symbol over a feature triggering symbol (e.g., scatter symbol) at a given symbol window position, game processing backend system 314 transforms the added substitution symbol to include both the symbol attribute for the feature triggering symbol (e.g., scatter symbol attribute) and for the substitution symbol (e.g., wild symbol attribute). Another example involves adding a substitution symbol over a plain-wild symbol generated from the random based game outcome. In this example, game processing backend system 314 could replace the wild symbol generated from the random based game outcome with the added substitution symbol. In another example, game processing backend system 314 could combine the substitution symbol and wild symbol attributes to form an upgraded substitution symbol (e.g., substitution symbol with a ×2 multiplier value).

Following the addition of substitution symbols (e.g., credit-substitution symbols and/or plain-substitution symbols) and the reels landing, bonus game play UI 308 presents one or more payout animations. In one or more implementation, for a plain-substitution symbol that forms a payline, bonus game play UI 308 presents a payout animation that pays out the corresponding payline award. For a credit-substitution symbol that forms a payline, bonus game play UI 308 presents a payout animation that pays out the corresponding payline award and another payout animation that pays out the credit value of the credit-substitution symbol. If the credit-substitution symbol is included in multiple paylines (e.g., four paylines), the bonus game play UI 308 presents multiple payout animations (e.g., four payout animations) that pays out the credit value of the credit-substitution symbol multiple times (four times). Other implementations could have bonus game play UI 308 present a payout animation based on paying out with the "ways" approach.

To support the different payout animations for a given credit-substitution symbol, game processing backend system 314 performs multiple payout operations when a credit-substitution symbol substitutes for another symbol type to form a payline. After determining that a credit-substitution symbol is part of a payline, game processing backend system 314 performs a payout operation using a pay table to determine the payout amount for the payline. Using FIG. 3 as an example, one of the lookup tables 322 could be a pay table that determines payout for a variety of paylines for a game. In another payout operation, game processing backend system 314 determines the credit value of the credit-substitution symbol that is part of the payline. The credit value of the credit-substitution symbol represents the payout amount for the payline in the second payout operation.

In a slot game context, after performing the payout animations, bonus game play UI 308 may present a re-spin feature that adds extra substitution symbols to the displayed reel area. In the re-spin feature, bonus game play UI 308 holds the substitution symbols already added to the reels in the add-substitution symbol supplemental feature and presents one or more re-spins of the reels. During a re-spin, bonus game play UI 308 adds one or more extra substitution symbols to the reels. As an example, the bonus game play UI 308 presents holding five substitution symbols that were previously added in the add-substitution symbol supplemental feature. As bonus game play UI 308 shows the reel spinning for the re-spin feature, the bonus game play UI 308 depicts one or more animations that add two extra substitution symbols at two different symbol window positions for a total of seven added substitution symbols. After bonus game play UI 308 presents the reels stopping and landing, bonus game play UI 308 provides one or more payout animations based on the presented random based game outcome and the seven added substitution symbols. In other gaming contexts, rather than implementing a re-spin feature, game processing backend system 314 performs a re-play feature (e.g., a re-draw feature).

To determine whether to perform a re-spin feature, game processing backend system 314 determines whether the results of the add-substitution symbol supplemental feature satisfies a re-spin trigger condition. In one example, the re-spin trigger condition represents a condition where the re-spin feature will likely or guarantee generate at least one payline regardless of the random based game outcome generated for the re-spin feature. In another example, the re-spin trigger condition represents a condition that guarantees a minimum payout amount for a re-spin feature. Game processing backend system 314 compares the re-spin trigger condition to whether the add-substitution symbol supplemental feature has added enough substitution-symbols at the relevant symbol window positions and/or reels. For example, the re-spin trigger condition could require the add-substitution symbol supplemental feature to have added from one to three substitution symbols on the reel in column 2 and from two to three substitution symbols on the reel in column 3 of the reel area.

Once game processing backend system 314 checks that the results of the add-substitution symbol supplemental feature satisfy the re-spin trigger condition, game processing backend system 314 randomly determines whether to trigger the re-spin feature. In one example, game processing backend system 314 performs an RNG pull from a lookup table 322 that is separate and independent from the RNG pulls that generate the random based game outcome for the re-spin feature. The lookup table 322 for determining whether to trigger the re-spin feature could be similar to Table 2 by having one entry weighted to trigger the re-spin feature and another entry weighted for not triggering the re-spin feature. After game processing backend system 314 determines that the re-spin feature should occur based on the lookup table 322, game processing backend system 314 randomly determines for each reel the number of extra substitution symbols to add and the type of substitution symbol. As an example, game processing backend system 314 could directly determine the number of extra substitution symbols to add for each real using a different set of lookup tables with different weights. To determine the substitution symbol type, game processing backend system 314 could use the same set of volatility lookup tables randomly selected in the add-substitution symbol supplemental feature for the re-spin feature. Game processing backend system 314 then performs one or more payout operations after landing the reels and adding the extra substitution symbols to the reels.

Figure 4:
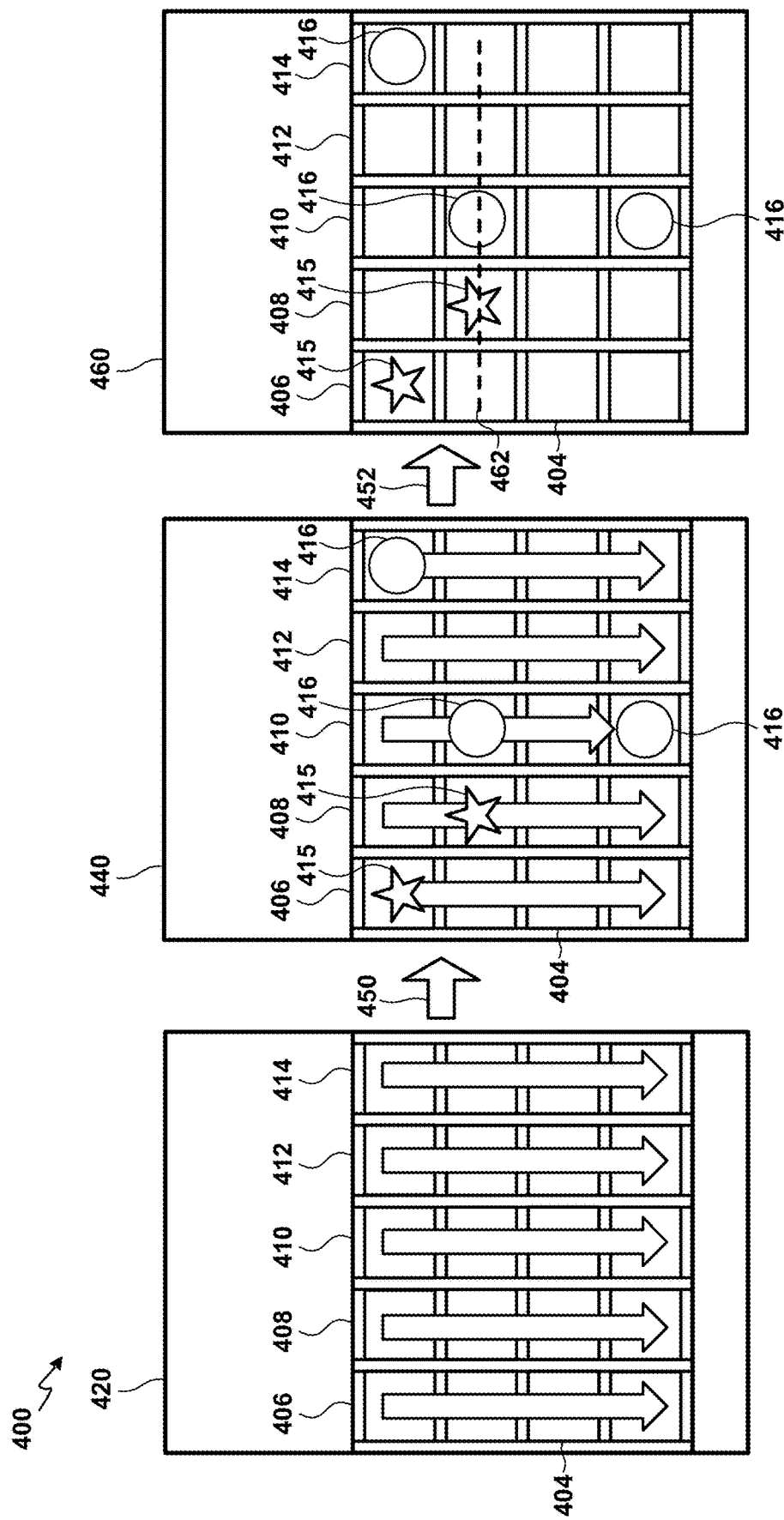
FIG. 4 is a diagram that depicts example general layouts of UIs related to presenting an add-substitution symbol supplemental feature that adds substitution symbols when the reels are spinning.
Figure 5:
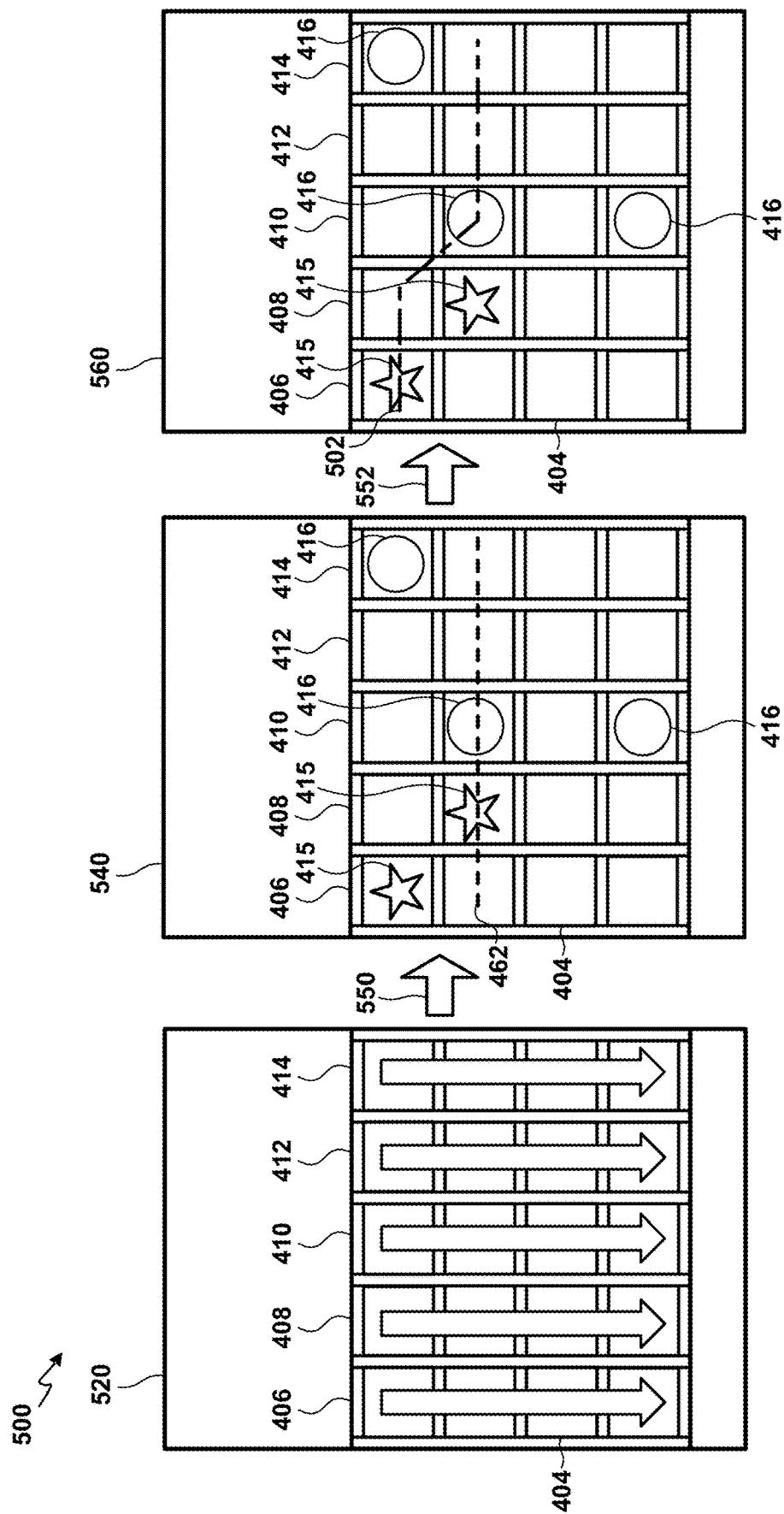
FIG. 5 is a diagram that depicts example general layouts of UIs related to presenting an add-substitution symbol supplemental feature that adds substitution symbols after the reels have stopped.
Figure 6:
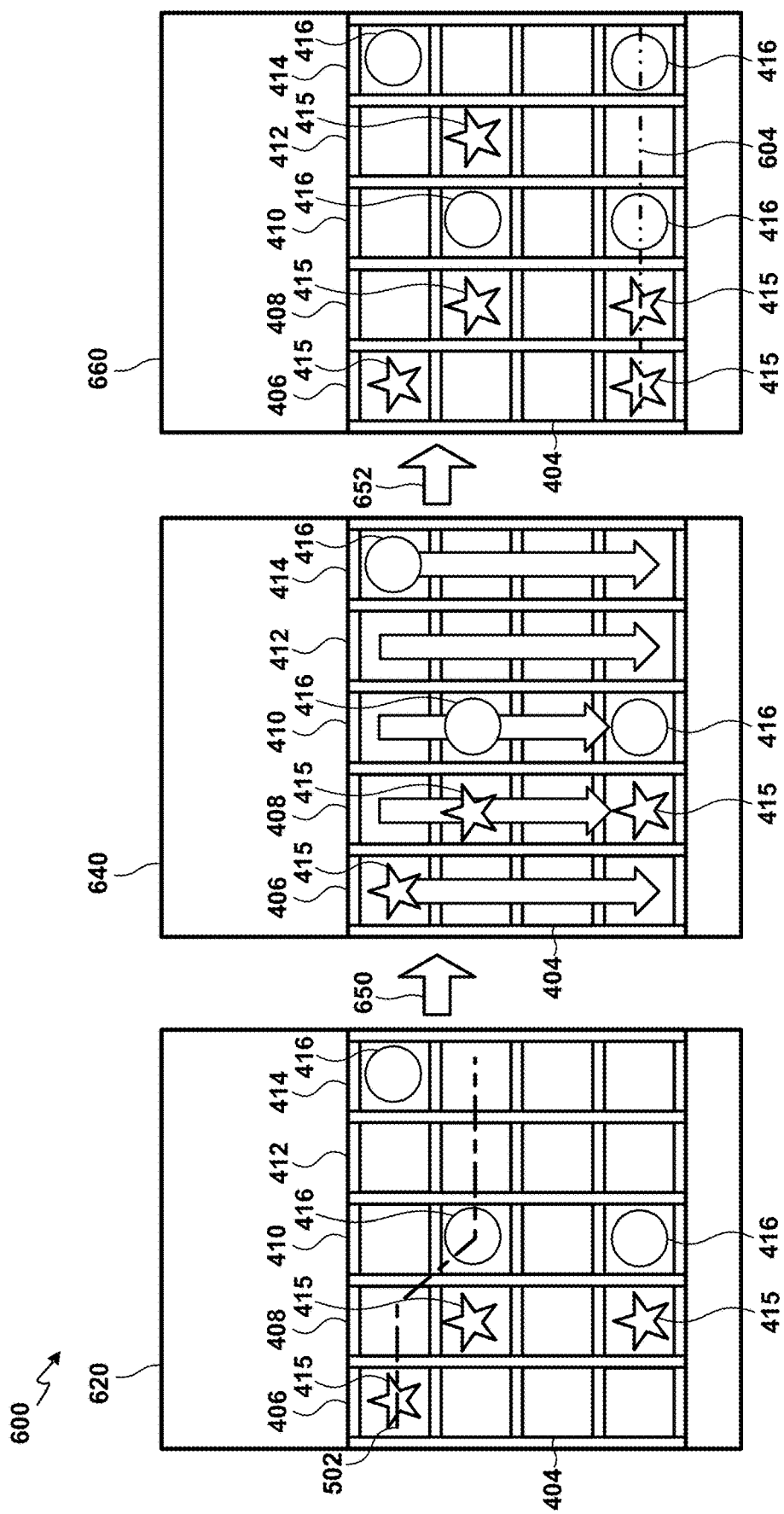
FIG. 6 is a diagram that depicts example general layouts of UIs related to presenting a re-spin feature that adds extra substitution symbols to reels after completing the add-substitution symbol supplemental feature.

FIGS. 4-6 are diagrams that depict example general layouts of UIs related to presenting add-substitution symbol sequences 400, 500, and 600. The add-substitution symbol sequences 400, 500, and 600 depict adding plain-substitution symbols 415 and credit-substitution symbols 416 to a reel area 404. Other implementations of the add-substitution symbol sequences 400, 500, and 600 could add other substitution symbol types, such as multiplier-substitution symbols to other game areas. A gaming device can present add-substitution symbol sequences 400, 500, and 600 when executing a game program. Using FIG. 2A as an example, when a gaming device 200 executes game program 206, the gaming device 200 displays bonus game play UIs 420, 440, 460, 520, 540, 560, 620, 640, and 660 on primary game display 240 and/or secondary game display 242. Additionally, or alternatively, at least some or all portions of the bonus game play UIs 420, 440, 460, 520, 540, 560, 620, 640, and 660 could be presented on mechanical reels and/or other types of mechanical and/or electro-mechanical components not shown in FIG. 2A.

In FIGS. 4-6, bonus game play UIs 420, 440, 460, 520, 540, 560, 620, 640, and 660 include a reel area 404 with a 5×4 reel configuration. The 5×4 reel configuration corresponds to five vertical reels 406, 408, 410, 412, and 414 that are four symbols high. Reel 406 corresponds to the left most vertical reel and reel 414 corresponds to the right most vertical reel. For a given reel stop, reel area 404 presents a total of 20 symbol window positions, where each reel in reel area 404 presents four symbol window positions. Other implementations of bonus game play UIs 420, 440, 460, 520, 540, 560, 620, 640, and 660 could have other reel configurations (e.g., 5×3 reel configuration) that present a different number of symbol window positions (e.g., 15 symbol window positions) and/or include reels with different orientations (e.g., a horizontal reel). Although bonus game play UIs 420, 440, 460, 520, 540, 560, 620, 640, and 660 show blanks in certain symbol window positions, those blanks do not necessarily represent a blank symbol or no symbols landing on those symbol window positions. Rather, the blank symbols could be other symbol types (e.g., picture symbols or royal symbols) that are not shown to facilitate ease of discussion.

In a slot context, reels 406, 408, 410, 412, and 414 shown in FIGS. 4-6 represent columns in reel area 404 that correspond to different reel strips from a set of reel strips. For example, reel 406 is positioned in column 1 and corresponds to reel strip 1; reel 408 is positioned in column 2 and corresponds to reel strip 2; reel 410 is positioned in column 3 and corresponds to reel strip 3; reel 412 is positioned in column 4 and corresponds to reel strip 4; and reel 414 is positioned in column 5 and corresponds to reel strip 5. The reel strips (e.g., reel strips 1-5) could have varying numbers of reel strip positions, where the total number of reel strips positions (e.g., more than 100 reel strip positions) for each reel strip is greater than the reel configuration shown in reel area 404. Reels 406, 408, 410, 412, and 412 act as vertical windows that display a portion of the reel strips when presenting the random based game outcome. Recall that a gaming device determines a random based game outcome for a given game instance by mapping RNG outcomes to reel positions for a set of reel strips. The mapped reel positions on the reel strips represent reel stops that the gaming device then maps to symbol window positions in reels 406, 408, 410, 412, and 414. As a result, adding substitution symbols to reels 406, 408, 410, 412, and 412 at different symbol window positions differ from adding substitution symbols to different reel strip positions on one or more reel strips.

With reference to FIG. 4, the add-substitution symbol sequence 400 presents an add-substitution symbol supplemental feature that adds substitution symbols when reels 406, 408, 410, 412, and 414 are spinning. Bonus game play UI 420 represents an initial UI that depicts reels 406, 408, 410, 412, and 414 spinning in reel area 404 after triggering the add-substitution symbol supplemental feature. As shown in bonus game play UI 420, the downward pointing arrows represent that each reel 406, 408, 410, 412, and 414 are spinning and that the random based game outcome has yet to be shown. While reels 406, 408, 410, 412, and 414 are spinning, add-substitution symbol sequence 400 presents an add-substitution symbol animation 450 to transition from bonus game play UI 420 to bonus game play UI 440. Specifically, the add-substitution symbol animation 450 adds one or more substitution symbols to one or more symbol window positions while reels 406, 408, 410, 412, and 414 are spinning.

Bonus game play UI 440 represents a UI that follows completion of adding substitution symbols while reels 406, 408, 410, 412, and 414 are spinning. The downward pointing arrows in bonus game play UI 440 are still present even after adding substitution symbols. The downward pointing arrows are present in bonus game play UI 440 to indicate that reels 406, 408, 410, 412, and 414 are still spinning. Bonus game play UI 440 also presents a plain-substitution symbol 415 added to both reels 406 and 408; two credit-substitution symbols 416 added to reel 410; no substitution symbols added to reel 412; and one credit-substitution symbol 416 added to reel 414.

The add-substitution symbol sequence 400 subsequently presents a random based game outcome and payout animation 452 to transition from bonus game play UI 440 to bonus game play UI 460. Bonus game play UI 460 presents a random based game outcome that has been modified with the addition of plain-substitution symbols 415 and credit-substitution symbols 416. Recall that plain-substitution symbols 415 and credit-substitution symbols 416 added to a symbol window position can replace and/or combine with the underlying symbols generated from the random based game outcome. Using FIG. 4 as an example, bonus game play UI 460 shows an added plain-substitution symbol 415 that could have replaced a royal symbol or picture symbol at the topmost symbol window position in reel 406. In another example, if the random based game outcome included a feature triggering symbol (e.g., a scatter symbol) at the topmost symbol window position, the added plain-substitution symbol 415 represents a symbol with combined symbol attributes.

Bonus game play UI 460 also illustrates a payline 462 that runs through the second row from the top of the reel area 404. In other words, payline 462 represents a horizontal payline that traverses across reels 406, 408, 410, 412, and 414. In bonus game play UI 460, payline 462 includes a plain-substitution symbol 415 and a credit-substitution symbol 416 on reels 408 and 410, respectively. Based on credit-substitution symbol 416 on reel 408 being part of payline 462, bonus game play UI 460 presents two payout animations. One payout animation pays out the payline award for payline 462 and another payout animation pays out the credit value of credit-substitution symbol 416 on reel 410. Bonus game play UI 460 does not display an additional payout animation for the plain-substitution symbol 415 that is part of payline 462. Although not shown in FIG. 4, the add-substitution symbol sequence 400 could include other payout animations for other paylines not shown in FIG. 4.

In FIG. 5, the add-substitution symbol sequence 500 presents an add-substitution symbol supplemental feature that adds substitution symbols after reels 406, 408, 410, 412, and 414 stop. Similar to bonus game play UI 420 shown in FIG. 4, bonus game play UI 520 represents an UI that depicts reels 406, 408, 410, 412, and 414 spinning in reel area 404 after triggering the add-substitution symbol supplemental feature. The downward pointing arrows in bonus game play UI 520 represent that each reel 406, 408, 410, 412, and 414 are spinning and that the random based game outcome has yet to land. Add-substitution symbol sequence 500 also presents an add-substitution symbol animation 550 to transition from bonus game play UI 520 to bonus game play UI 540. In contrast to the add-substitution symbol animation 450 shown in FIG. 4, the add-substitution symbol and payout animation 550 adds one or more substitution symbols to one or more symbol window positions after reels 406, 408, 410, 412, and 414 stop and present the random based game outcome.

Bonus game play UI 540 presents the random based game outcome before adding plain-substitution symbols 415 and credit-substitution symbols 416 to symbol window positions. Similar to bonus game play UI 460 shown in FIG. 4, the plain-substitution symbols 415 and credit-substitution symbols 416 have replaced and/or combined with symbols generated from the random based game outcome. Bonus game play UI 540 also illustrates payline 462 that runs through the second row from the top of reel area 404 and includes a plain-substitution symbol 415 and a credit-substitution symbol 416. Because of credit-substitution symbol 416, bonus game play UI 460 presents two payout animations. One payout animation depicts paying out the payline award determined for payline 462 and another payout animation depicts paying out the credit value of the credit-substitution symbol 416 that is part of payline 462.

The add-substitution symbol sequence 500 subsequently presents payout animation 552 to transition from bonus game play UI 540 to bonus game play UI 560. The payout animation 552 causes bonus game play UI 560 to depict a diagonal payline 502 that traverses through reels 406, 408, 410, 412, and 414. The diagonal payline 502 includes a plain-substitution symbol 415 located at the topmost symbol window position of reel 406 and the same credit-substitution symbol 416 located on reel 410 that was part of payline 462. Similar to payline 462, bonus game play UI 560 presents two payout animations for diagonal payline 502. One payout animation that awards the payline award determined for diagonal payline 502 and another payout animation that awards the credit value of the credit-substitution symbol 416 that is part of payline 502. Bonus game play UI 560 does not present another payout animation for the plain-substitution symbol 415 that forms payline 502. Based on the two the paylines 462 and 502 that traverses through the same credit-substitution symbol 416 on reel 410, the add-substitution symbol sequence 500 performs two separate payout animations that pays out the credit value of credit-substitution symbol 416 twice. Although not shown in FIG. 5, the add-substitution symbol sequence 500 could include other payout animations for other paylines not shown in FIG. 5.

The add-substitution symbol sequence 600 shown in FIG. 6 presents a re-spin feature that adds extra substitution symbols to reels 406, 408, 410, 412, and 414 after completing the add-substitution symbol supplemental feature. Similar to bonus game play UI 560 shown in FIG. 5, bonus game play UI 620 represents an UI that depicts a random based game outcome after adding plain-substitution symbols 415 and credit-substitution symbols 416 to symbol window positions. Based on the random based game outcome, bonus game play UI 620 displays a diagonal payline 502 that causes two separate payout animations, one payout animation for the payline award and another payout animation for the credit value of credit-substitution symbol 416 on reel 410. After performing the payout animations for the add-substitution symbol supplemental feature, add-substitution symbol sequence 500 presents a re-spin animation 650 that transitions the bonus game play UI 620 to bonus game play UI 640. The re-spin animation 650 causes bonus game play UI 640 to hold the plain-substitution symbols 415 and credit-substitution symbols 416 added during the add-substitution symbol supplemental feature while reels 406, 408, 410, 412, and 414 re-spin.

The random based game outcome and payout animation 652 causes bonus game play UI 660 to present a random based game outcome that has been modified with the plain-substitution symbols 415 and credit-substitution symbols 416 during the add-substitution symbol supplemental feature and the extra plain-substitution symbols 415 and credit-substitution symbol 416 added during the re-spin feature. In FIG. 6, bonus game play UI 660 illustrates that the random based game outcome and payout animation 652 causes three extra substitution symbols to be added to reel area 404. Specifically, an extra plain-substitution symbol 415 is added on reel 406, an extra plain-substitution symbol 415 is added on reel 412, and an extra credit-substitution symbol 416 is added on reel 414. Based on the extra substitution symbols, bonus game play UI 660 illustrates a new payline 604 that that runs through the bottom row of reels 406, 408, 410, 412, and 414. The payline 604 includes two credit-substitution symbols 416, one located on the reel in column 3 and the other located on the reel in column 5. Because of the two credit-substitution symbols 416 part of payline 604, bonus game play UI 660 will present two payout animations that pay out the two credit values of credit-substitution symbols 416. Although not shown in FIG. 6, the add-substitution symbol sequence 600 could include other payout animations for other paylines not shown in FIG. 6.

Figure 7:
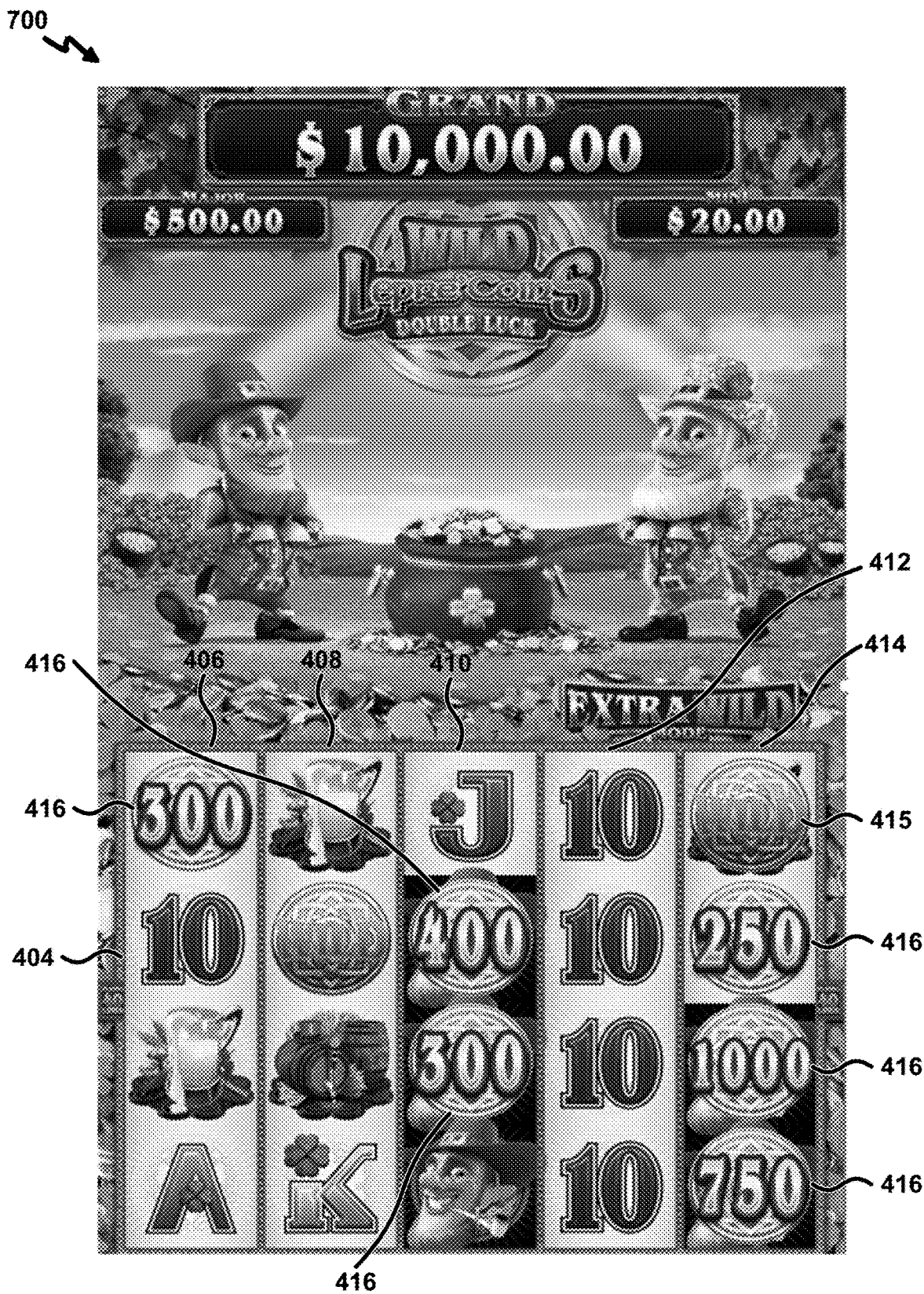
FIG. 7 is an example screenshot of a bonus game play UI that corresponds to a themed version of a bonus game play UI shown in FIG. 4.

FIG. 7 is an example screenshot of a bonus game play UI 700 that corresponds to a themed version of bonus game play UI 440 shown in FIG. 4. The bonus game play UI 700 has a substantially similar UI layout as bonus game play UI 440, but with additional graphical elements associated with the game's theme. For example, bonus game play UI 700 depicts themed versions of the plain-substitution symbols and the credit-substitution symbols. Moreover, similar to bonus game play UI 440, bonus game play UI 440 presents a reel area 404 with 20 symbol window positions from a 5×4 reel configuration. Bonus game play UI 700 also represents an UI that presents overlaying plain-substitution symbols 415 and credit-substitution symbols 416 over a random based game outcome. As shown in FIG. 7, the credit-substitution symbols 416 in bonus game play UI 700 have varying credit values.

Figure 8:
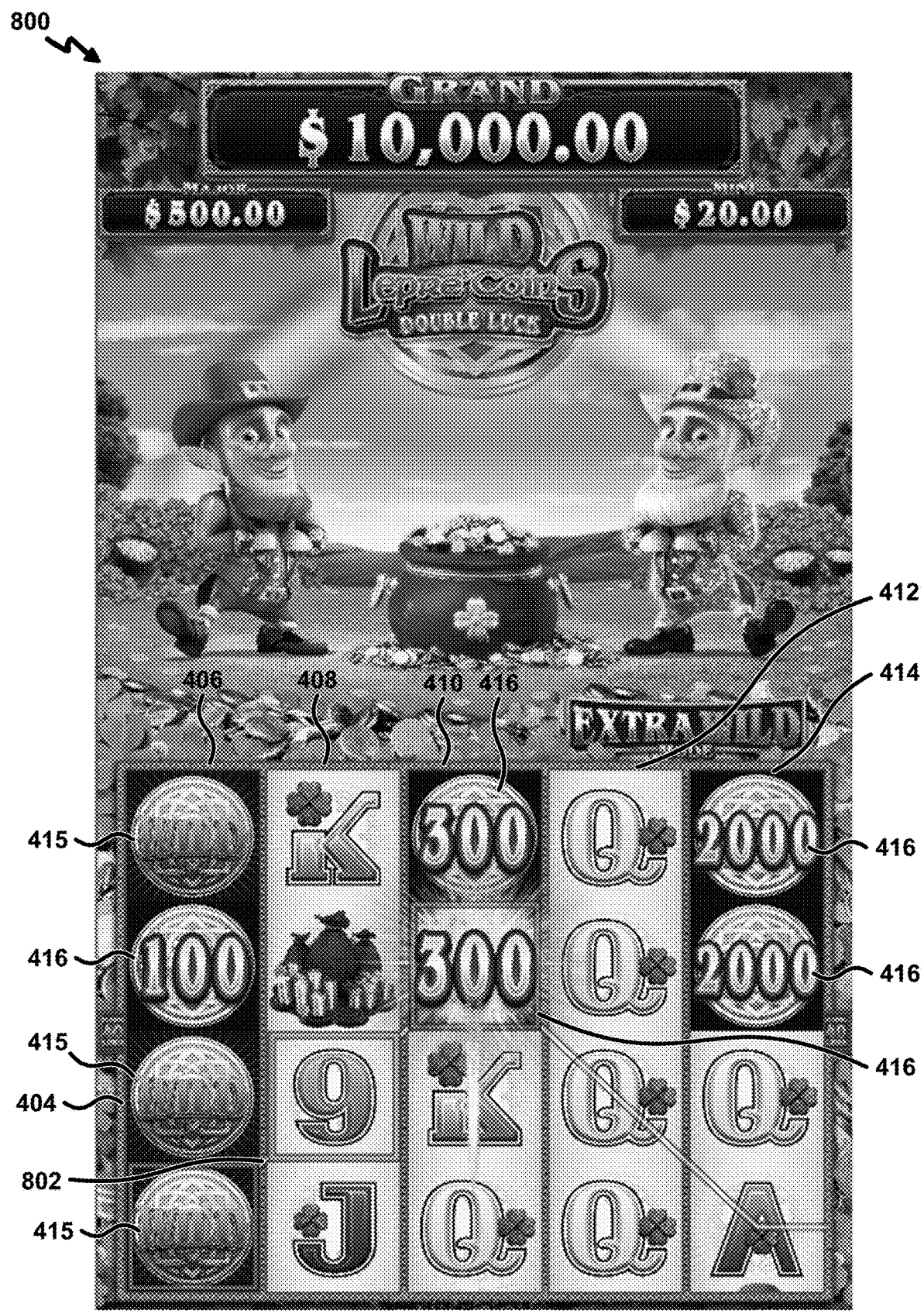
FIG. 8 is an example screenshot of a bonus game play UI that corresponds to a themed version of bonus game play UIs shown in FIGS. 4-6.

FIG. 8 is an example screenshot of a bonus game play UI 800 that corresponds to a themed version of bonus game play UIs 460, 540, 560, and 620 shown in FIGS. 4-6. The bonus game play UI 800 has a substantially similar UI layout as bonus game play UIs 460, 540, 560, and 620, but with additional graphical elements associated with the game's theme. As shown in FIG. 8, the bonus game play UI 800 displays a payline 802 that includes a credit-substitution symbol 416. Specifically, payline 802 includes the plain-wild substitution symbol 415 located on the bottom left corner of reel 406, the nine symbol located on reel 408, and the credit-substitution symbol 416 with a credit value of 300 on reel 410. The plain-wild substitution symbol 415, the nine symbol, and the credit-substitution symbol 416 within payline 802 have win boxes around the symbols with short payline connectors that connect the win boxes. FIG. 8 also illustrates a line that travels through the queen symbol on reel 412 and the ace symbol on the reel 414. Although the line appears to be part of payline 802, bonus game play UI 800 does not present win boxes around the symbols to indicate the symbols are not part of payline 802. For payline 802, bonus game play UI 800 presents two payout animations, one payout animation that pays out the payline award determined for payline 802 and another payout animation that pays out the credit value of credit-substitution symbol 416.

Figure 9:
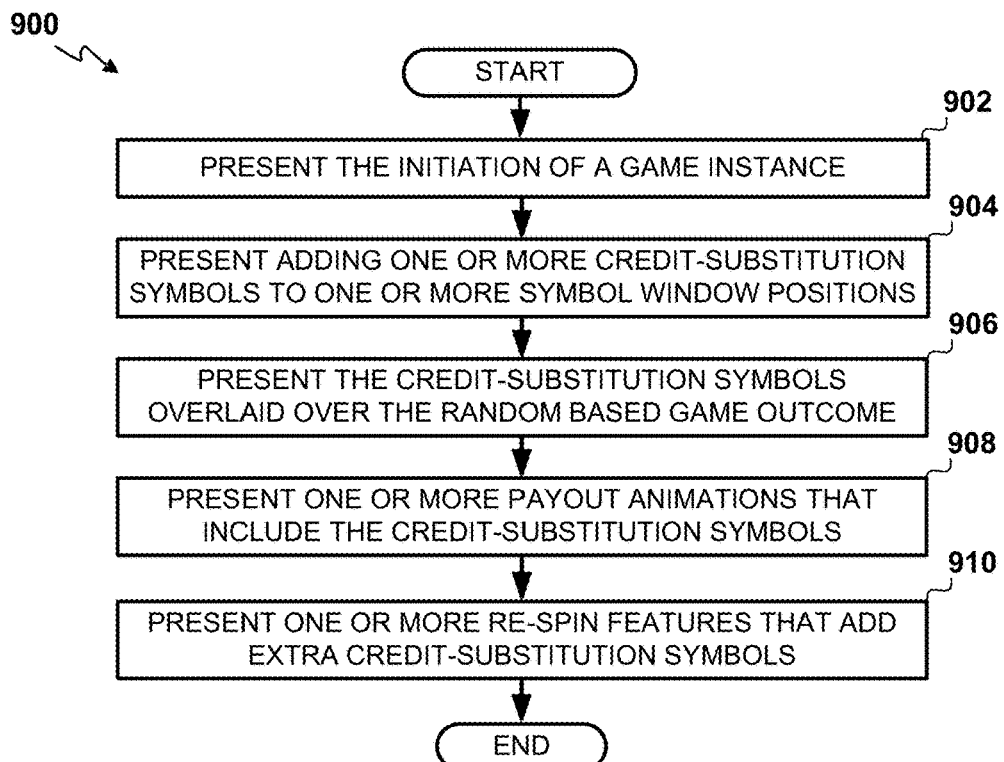
FIG. 9 depicts a flowchart illustrating a UI based operation for presenting a add-substitution symbol supplemental feature triggered from a base game and/or supplement game feature.

FIG. 9 depicts a flowchart illustrating a UI based operation 900 for presenting a add-substitution symbol supplemental feature triggered from a base game and/or supplement game feature. In one or more implementations, the UI based operation 900 may be implemented by a UI system 302 shown in FIG. 3 and/or displayed on the primary game display 240 and secondary game display 242 of a gaming device 200 shown in FIG. 2A. The UI based operation 900 also corresponds to the bonus game play UIs shown in FIGS. 4-8. The use and discussion of FIG. 9 is only an example to facilitate explanation and is not intended to limit the disclosure to this specific example. Specifically, UI based operation 900 does not necessarily need to perform the sequence of blocks in the order as depicted in FIG. 9. As an example, UI based operation 900 may implement blocks 904 and 906 concurrently rather than sequentially. Additionally, or alternatively, one or more of the blocks may be optional and may not be performed in all implementations of UI based operation 900. For example, block 910 may be optional and may not be performed when a re-spin feature fails to trigger.

UI based operation 900 may start at block 902 to present the initiation of a game instance. During the initiation of the game instance, UI based operation 900 may transition from a base game and/or supplemental game feature to an add-substitution symbol supplemental feature. In one or more implementations, the reel configuration shown in a reel area remains the same size. At block 904, UI based operation 900 presents adding one or more credit-substitution symbols to one or more symbol window positions in a displayed reel area. As previously discussed, UI based operation 900 may add credit-substitution symbols while the reels are still spinning or after the reels land and present the random based game outcome. Recall that adding substitution symbols, such as credit-substitution symbols, to symbol window positions differs from adding substitution symbols to reel strip positions on reel strips. For example, adding substitution symbols to one or more reel strip positions on reel strips does not ensure the substitution symbols will land and be shown within the displayed reel area when presenting the random based game outcome.

From block 904, the UI based operation 900 moves to block 906 to present the credit-substitution symbols overlaid over the random based game outcome. Based on the overlay, the credit-substitution symbols can either replace or combine with underlying symbols that land for a random based game outcome. For example, if UI based operation 900 overlays a credit-substitution symbol over a feature trigger symbol, the credit-substitution symbol acts both as a substitution symbol type and feature trigger symbol type. UI based operation 900 may then proceed to block 908 and present one or more payout animations that include credit-substitution symbols. Based on the random based game outcome and the overlaid credit-substitution symbols, UI based operation 900 may present two separate payout animations for each credit-substitution symbol that is part of a payline. One payout animation awards the payline award and another payout animation that awards the credit value of the credit-substitution symbol.

After performing the payout animations, UI based operation 900 moves to block 910 and presents one or more re-spin features that add extra credit-substitution symbols. In one or more implementations, a re-spin feature causes UI based operation 900 to hold the credit-substitution symbols added at block 904 while re-spinning the reels. UI based operation 900 can add extra credit-substitution symbols while the reels are re-spinning or after the reels stop and preset another random based game outcome. Afterwards, UI based operation 900 presents payout animations for all paylines generated from the re-spin. Similar to block 908, UI based operation 900 may present two separate payout animations for each credit-substitution symbol that is part of a payline.

Figure 10:
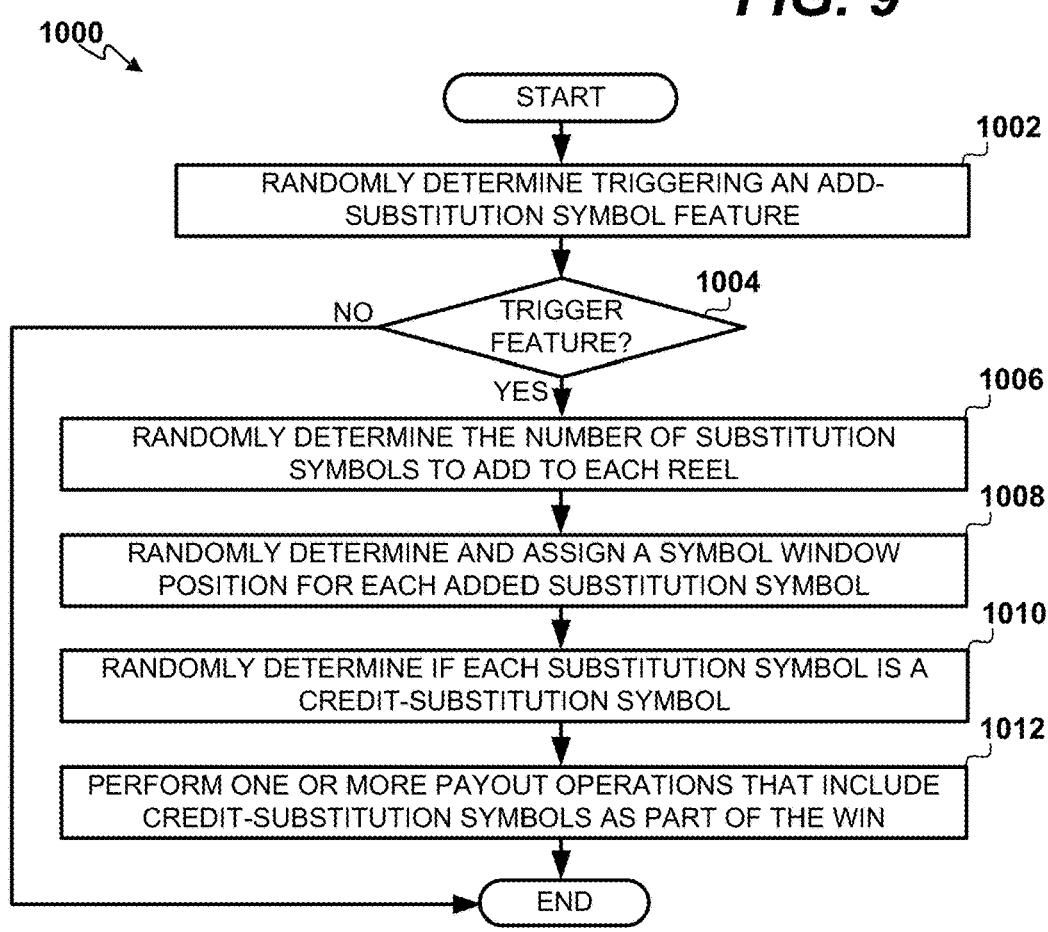
FIG. 10 depicts a flowchart illustrating backend-based operation for implementing one or more credit-substitution symbol mechanics.

FIG. 10 depicts a flowchart illustrating backend-based operation 1000 for implementing one or more credit-substitution symbol mechanics. For example, backend-based operation 1000 includes a random substitution determination operation that supports the UI based operation 900 discussed with reference to FIG. 9. In one or more implementations, backend-based operation 1000 may be implemented by a game processing backend system 314 shown in FIG. 3 and/or by a game controller 202 shown in FIG. 2A. The use and discussion of FIG. 10 is only an example to facilitate explanation and is not intended to limit the disclosure to this specific example. In particular, backend-based operation 1000 does not necessarily need to perform the sequence of blocks in the order as depicted in FIG. 10. As an example, backend-based operation 1000 shown in FIG. 10 directly determines the number of substitution symbols to add to a given reel. Other implementations of backend-based operation 1000 could indirectly determine the number of substitution symbols to add to a given reel by readjusting the sequence of blocks and/or not including one or more of the blocks. Using FIG. 10 as an example, backend-based operation 1000 may not perform block 1006 when indirectly determining the number of substitution symbols to add to a given reel.

In FIG. 10, backend-based operation 1000 implements a credit-substitution symbol mechanic presented by UI based operation 900 shown in FIG. 9. Backend-based operation 1000 may start at block 1002 to randomly determine triggering an add-substitution symbol feature. With reference to FIG. 3, Table 2 previously discussed is an example lookup table backend-based operation 1000 may use to map the RNG outcome to a decision on whether to trigger the add-substitution symbol supplemental feature. Other implementations of backend-based operation 1000 could determine whether to trigger the add-substitution symbol feature based on a generated random based game outcome. At block 1004, backend-based operation 1000 determines that if no add-substitution symbol feature triggers, backend-based operation 1000 ends. Otherwise, backend-based operation 1000 may move to block 1006.

To perform a random substitution determination operation, at block 1006, backend-based operation 1000 randomly determines the number of substitution symbols to add to each reel in the displayed reel area. Specifically, backend-based operation 1000 directly determines the number of substitution symbols to add to a given reel by using a lookup table that maps an RNG outcome to the number of substitution symbols to add to the given reel. Table 3, which was previously shown, is an example of a lookup table backend-based operation 1000 could use to determine the number of substitution symbols to add to the given reel. In one or more implementations, backend-based operation 1000 uses a single lookup table to determine the number of substitution symbols to add to each reel. In other implementations, backend-based operation 1000 uses multiple lookup tables, for example, a different lookup table for each reel.

At block 1008, as part of the random substitution determination operation, backend-based operation 1000 randomly determines and assigns a symbol window position for each added substitution symbol. To randomly determine symbol window positions, backend-based operation 1000 performs an RNG pull from a lookup table that maps an RNG outcome to an available symbol window position for a given reel. In one or more implementations, the lookup table weights the available symbol window positions equally. When a backend-based operation 1000 determines the symbol window position for the substitution symbol, backend-based operation 1000 places and/or assigns the substitution symbol to a specific window position in the given reel. Afterwards, for the given reel, backend-based operation 1000 removes the symbol window position from the list of available symbol window positions. Removing unavailable symbol window positions allows backend-based operation 1000 to avoid determining and assigning a substitution symbol to a symbol window position that already has been assigned with another added substitution symbol.

At block 1010, as part of the random substitution determination operation, backend-based operation 1000 randomly determines if each substitution symbol is a credit-substitution symbol. In one or more implementations, backend-based operation 1000 randomly determines which set of substitution volatility lookup tables to use when determining whether to add plain-substitution symbols and/or credit-substitution symbols. In particular, backend-based operation 1000 can use a lookup table that maps an RNG outcome to one of the sets of substitution volatility lookup tables. For example, the backend-based operation 1000 can have two sets of substitution volatility lookup tables, one set configured to generate credit-substitution symbols at a relatively lower rate than the second set of substitution volatility lookup tables. The lookup table could be weighted to be more likely to select the set of substitution volatility lookup tables with a relatively lower rate. Each set of substitution volatility lookup tables includes separate substitution volatility lookup table for each reel displayed in the reel area. After randomly selecting one set of substitution volatility lookup tables, backend-based operation 1000 uses the appropriate substitution volatility lookup table to randomly determine whether each added substitution symbol for a given reel should be a credit-substitution symbol or some other substitution symbol type. For each credit-substitution symbol added to the displayed reel area, the backend-based operation 1000 could also randomly determine the credit values using a credit volatility lookup table associated with a given reel.

At block 1012, backend-based operation 1000 performs one or more payout operations that include credit-substitution symbols as part of the win. In a payline context, backend-based operation 1000 determines which credit-substitution symbol is part of a payline. For each credit-substitution symbol that is part of a payline, backend-based operation 1000 performs multiple payout operations. Backend-based operation 1000 performs one payout operation that determines the payout amount for the payline according to a pay table. Using FIG. 3 as an example, one of the lookup tables 322 could be a pay table that determines payout for a variety of paylines for a game. In another payout operation, backend-based operation 1000 determines the credit value of the credit-substitution symbol that is part of the payline. The credit value of the credit-substitution symbol represents the payout amount for the payline for the other payout operation.

Credit-Substitution Symbol Mechanics with Reel Growth

In a slot game context, a gaming device can present an add-substitution symbol supplemental feature with reel growth over a single game instance. Returning to FIG. 3 as an example, to implement one or more credit-substitution symbol mechanics that includes a reel growth operation, UI system 302 starts off by presenting a base game to a player using game play UI 304. Game play UI 304 includes an initial reel area with a set of reels arranged with an initial reel configuration, such as a 5×4 reel configuration. For one or more game instances, game play UI 304 randomly transition to bonus game play UI 308 to present an add-substitution symbol supplemental feature with reel growth. When presenting the add-substitution symbol supplemental feature with reel growth, bonus game play UI 308 modifies the reel configuration and adds one or more substitution symbols (e.g., credit-substitution symbols and/or plain-substitution symbols) at one or more symbol window positions in the displayed reel area. Specifically, bonus game play UI 308 can present one or more animations that expands the reel size and adds substitution symbols to one or more symbol window positions in the expanded reel area and/or the initial reel area.

To support the add-substitution symbol supplemental feature with reel growth, game processing backend system 314 randomly determines whether to trigger the add-substitution symbol supplemental feature with reel growth. In one or more implementations, to randomly trigger the add-substitution symbol supplemental feature with reel growth within a base game and/or supplemental game feature, game processing backend system 314 performs an RNG pull from a lookup table 322 similar to Table 2. The RNG pull that triggers the add-substitution symbol supplemental feature is separate and independent from the RNG pulls that generate the random based game outcome in the base game and/or supplemental game feature. In other words, game processing backend system 314 triggers the add-substitution symbol supplemental feature with reel growth independently and separately from the random based game outcome. In other implementations, game processing backend system 314 triggers the add-substitution symbol supplemental feature with reel growth based on the random based game outcome generated within a game instance. As an example, an add-substitution symbol supplemental feature with reel growth that occurs over multiple game instances may be randomly triggered according to a random based game outcome (e.g., landing three scatter symbols in the reels).

After game processing backend system 314 determines to trigger the add-substitution symbol supplemental feature, game processing backend system 314 performs a reel growth, substitution determination operation. For an add-substitution symbol supplemental feature that occurs within a single spin, game processing backend system 314 performs a reel growth, substitution determination operation that randomly expands the reel size and adds substitution symbols. To maintain a target game RTP, game processing backend system 314 links together multiple game evaluations associated with the reel growth, substitution determination operation using a single lookup table and single RNG outcome. As an example, when game processing backend system 314 performs an RNG pull from the lookup table 322, the lookup table 322 maps the RNG outcome to the multiple game evaluations: (1) the determined expanded reel size, (2) determined reels with added substitution symbols, and (3) the substitution symbol types for the added substitution symbols. Other examples could map the RNG outcome to other game evaluations, such as determined symbol window positions with substitution symbols.

Table 4 shown below represents an example lookup table that maps the RNG outcome to the determined expanded reel size, determined reels with added substitution symbols, and the substitution symbol types for the substitution symbols added to each reel. As shown in Table 4, the first table entry with a count value of 50 represents that the reel size will grow from a 5×4 reel configuration to a 5×7 reel configuration while the third table entry with a count value of 30 will grow to a 5×9 reel configuration. For both the first and third table entries, each reel within a reel area will have at least one plain-substitution symbol added to one or more of the reel's symbol window positions. Stated another way, any substitution symbol that is added to any reel will be a plain-substitution symbol, not a credit-substitution symbol. In contrast, for the last table entry with a count value of one, reels in columns 3 and 4 of the reel area will have at least one credit-substitution symbol added while reels in columns 1, 2, and 5 will have at least one plain-substitution symbols added to the reels. Any substitution symbol added to reels in columns 3 and 4 will be credit-substitution symbols, and any substitution symbol added to reels in columns 1, 2, and 5 will be plain-substitution symbols.

TABLE 4

Example Lookup Table for Determining Expansion Reel Size and Substitution Symbols Added

| Count Value | Reel Size/Reels with Substitution Symbols/Substitution Symbol Types |
|---|---|
| 50 | 5 × 7 reel size; Reels in columns 1-5 have plain-substitution symbols added |
| 40 | 5 × 8 reel size, Reels in columns 1-5 have plain-substitution symbols added |
| 30 | 5 × 9 reel size, Reels in columns 1-5 have plain-substitution symbols added |
| 5 | 5 × 7 reel size; Reels in columns 1, 2, 4, and 5 have plain-substitution symbols added; Reel in column 3 has credit-substitution symbols added |
| 1 | 5 × 7 reel size; Reels in columns 1, 2, and 5 have plain-substitution symbols added; Reels in columns 3 and 4 have credit-substitution symbols added |

Table 4 may be only a portion of the lookup table 322 and could include other entries that cover the different combinations of placing substitution symbols for different reel size and adding plain-substitution symbols and/or credit-substitution symbols across the different reels. As an example, Table 4 could have entries that expand the reels up to 14 rows and/or have credit-substitution symbols added and assigned to symbol window positions for all reels. Other implementations of Table 4 could include table entries that map RNG outcomes to other substitution symbol types.

In one or more implementations, the lookup table that links multiple game evaluations associated with the reel growth, substitution determination operation could also be configured to account for a designated minimum number of reels that will have at least one substitution symbol added to the reels. As an example, Table 4 can be constructed to add at least one substitution symbol to two or more reels. If the designated minimum number of reels that will have at least one substitution symbol added to the reels is two reels, Table 4 will not include table entries that represents adding substitution symbols to only a single reel. Instead, Table 4 would map all RNG outcomes to table entries that represent adding substitution symbols to at least two reels. Designating a minimum number of reels that will have at least one substitution symbol added to the reels assists in increasing game volatility for the single game instance while maintaining a target game RTP.

In one or more implementations, the lookup table that links multiple game evaluations associated with the reel growth, substitution determination operation could also be configured to assign certain substitution symbol types to a subset of the reels. Game processing backend system 314, for example, could configure Table 4 and/or other lookup tables to provide plain-substitution symbols to all reels and credit-substitution symbols to reels in columns 3, 4, and/or 5. By doing so, Table 4 is unable to map an RNG outcome to a table entry that designates credit-substitution symbols to be added to reels in columns 1 and/or 2. In another example, plain-substitution symbols could be added to reels in columns 1-4 and not to the reel in column 5. Designating certain reels to generate certain substitution symbol types could also increase game volatility for the single game instance while maintaining a target game RTP.

After determining the expanded reel size and the substitution symbol type for substitution symbols added to the reels, game processing backend system 314 determines, as part of the reel growth, substitution determination operation, which symbol window positions will receive substitution symbols. In one or more implementations, rather than directly determining the number of substitution symbols to add to a given reel, game processing backend system 314 indirectly determines the number of substitution symbols to add to a given reel. Specifically, game processing backend system 314 performs the reel growth, substitution determination operation by using one or more lookup tables 322 to randomly determine which symbol window positions will receive substitution symbols. For example, for each symbol window position, game processing backend system 314 performs a separate RNG pull from one or more lookup tables 322 that maps an RNG outcome to whether or not game processing backend system 314 should place and assign a substitution symbol. Afterwards, for each reel, game processing backend system 314 counts the number of symbol window positions with added substitution symbols to indirectly determine the number of substitution symbols added to the reel.

Using Table 4 as an example, game processing backend system 314 may randomly select the first table entry that indicates all reels will add plain-substitution symbols. Based on the selection, game processing backend system 314 performs seven different RNG pulls for each reel, which equals to a total of 35 different RNG pulls for all five reels. Game processing backend system 314 performs seven different RNG pulls because the reel configuration expands from four rows to seven rows. Each RNG pull randomly determines whether to add a plain-substitution symbol to a specific window position. In other words, for each RNG pull, game processing backend system 314 maps the RNG outcome to whether a symbol window position should receive the plain-substitution symbol.

In one or more implementations, as part of the reel growth, substitution determination operation, game processing backend system 314 can also account for a designated minimum number of substitution symbols that should be added to each reel based on the expanded reel size. Game processing backend system 314 can be setup to increase the designated minimum number of substitution symbols that should be added to each reel after the reel configuration reaches a certain reel size. As an example, the designated minimum number of substitution symbols could be set to add and assign two substitution symbols to each reel when the reel area expands to a 5×7 reel configuration. If the reel area expands to a 5×14 reel configuration, the designated minimum number of substitution symbols could be set to add and assign four substitution symbols to each reel. For any reel, if game processing backend system 314 fails to satisfy the designated minimum number of substitution symbol to add for a given reel (e.g., two plain-substitution symbol), game processing backend system 314 reperforms the RNG pulls for the given reel until satisfying the designated minimum number of substitution symbol to add for the given reel.

If the game processing backend system 314 determines that credit-substitution symbols will be added to one or more reels, as part of the reel growth, substitution determination operation, game processing backend system 314 utilizes one or more credit volatility lookup tables that dynamically determine the range of the credit values assigned for credit symbols (e.g., low, medium, or high game credit values). Referring again to Table 4, if game processing backend system 314 randomly selects table entry four indicating the reel in column 3 will receive credit-substitution symbols, game processing backend system 314 performs one or more separate RNG pulls to determine the credit values for each credit-substitution symbol assigned to a symbol window position. In one example, game processing backend system 314 may perform an RNG pull from one lookup table 322 (e.g., lookup table 322K) to determine whether the reel in column 3 will fall in the low, medium, or high game credit value range. Game processing backend system 314 then performs another RNG pull using a separate lookup table 322 (e.g., lookup table 322L) that corresponds to the selected volatility range to determine the credit value. Alternatively, as previously disclosed, game processing backend system 314 could use separate credit volatility lookup tables for each reel to determine the credit values.

After presenting the addition of substitution symbols (e.g., credit-substitution symbols and/or plain-substitution symbols) and the reels landing, bonus game play UI 308 presents one or more payout animations. In one or more implementation, for a given plain-substitution symbol that forms a payline, bonus game play UI 308 does not present an additional payout animation on top of the payline award. For a given credit-substitution symbol that forms a payline, bonus game play UI 308 presents a payout animation that pays out the payline award and another payout animation that pays out the credit value of the credit-substitution symbol. If the credit-substitution symbol is included in multiple paylines (e.g., four paylines), the bonus game play UI 308 presents multiple payout animations (e.g., four payout animations) that pays out the credit value of the credit-substitution symbol multiple times (four times). Other implementations could have bonus game play UI 308 present a payout animation based on paying out with the "ways" approach.

To support the different payout animations for a given credit-substitution symbol, game processing backend system 314 performs multiple payout operations when a credit-substitution symbol substitutes for another symbol type to form a payline. After determining that a credit-substitution symbol is part of a payline, game processing backend system 314 performs a payout operation using a pay table to determine the payout amount for the payline. Using FIG. 3 as an example, one of the lookup tables 322 could be a pay table that determines payout for a variety of paylines for a game. In another payout operation, game processing backend system 314 determines the credit value of the credit-substitution symbol that is part of the payline. The credit value of the credit-substitution symbol represents the payout amount for the payline in the second payout operation.

Based on the payout operations for the paylines, game processing backend system 314 determines a total payout for the add-substitution symbol supplemental feature. In one or more implementations, game processing backend system 314 can check whether the total payout amount exceeds a threshold payout amount. The threshold payout amount can be based on a variety of game parameters, such as bet level and/or bet multiplier. For example, if game processing backend system 314 determines that the total payout for the add-substitution symbol supplemental feature is less than two times the bet level, game processing backend system 314 reperforms the reel growth, substitution determination operation. Game processing backend system 314 could reperform the reel growth, substitution determination operation until the total payout for the add-substitution symbol supplemental feature is at least three times the bet level. The UI system 302 does not present the random based game outcomes generated from the reel growth, substitution determination operations that fail to produce a total payout that satisfies the threshold payout amount. Rather, UI system 302 presents the first random based game outcome where the total payout satisfies the threshold payout amount. Checking for a minimum total payout for maintains a target game RTP and a certain game volatility.

In one or more implementations, the UI system 302 can present an add-substitution symbol supplemental feature with reel growth over multiple game instances. Using FIG. 3 as an example, the UI system 302 starts off by presenting a base game to a player using game play UI 304. For a given game instance, game play UI 304 presents a random based game outcome that triggers the add-substitution symbol supplemental feature with reel growth and causes UI system 302 to transition to bonus game play UI 308. After transitioning, bonus game play UI 308 presents an initial number of game instances (e.g., five initial game instances) for the add-substitution symbol supplemental feature with reel growth. The number of game instances increases for the add-substitution symbol supplemental feature with reel growth when bonus game play UI 308 presents a free game instance symbol (e.g., +1 spin symbol) during one or more of the initial game instances. Bonus game play UI 308 includes an initial reel area with an initial reel configuration, such as a 5×4 reel configuration, at the start of the first game instance. In one or more of the initial game instances, during the first game instance and/or other game instances, bonus game play UI 308 randomly expands the reel size and/or adds substitution symbols to one or more symbol window positions in the expanded reel area.

To present an add-substitution symbol supplemental feature with reel growth, game processing backend system 314 randomly triggers the add-substitution symbol supplemental feature with reel growth. Similar to the previously described add-substitution symbol supplemental features, game processing backend system 314 can randomly trigger the add-substitution symbol supplemental feature with reel growth based on the generated random based game outcome or a separate and independent RNG pull. After game processing backend system 314 determines to trigger the add-substitution symbol supplemental feature, game processing backend system 314 performs a reel growth, substitution determination operation. In particular, game processing backend system 314 performs a reel growth, substitution determination operation that randomly expands the reel size and adds substitution symbols over multiple game instances (e.g., multiple spins).

When performing the reel growth, substitution determination operation, game processing backend system 314 randomly determines the reel size for each of the initial game instances. In one or more implementations, game processing backend system 314 performs an RNG pull from one or more lookup tables 322 that maps the RNG outcomes to certain reel sizes. Specifically, game processing backend system 314 performs a separate RNG pull for each of the initial game instances. Based on the RNG pull, game processing backend system 314 determines a reel size for each game instance. For example, game processing backend system 314 could randomly determine the reel size for the first and the second game instance of the add-substitution symbol supplemental feature with reel growth is a 5×7 reel configuration and 5×8 reel configuration, respectively. From the random determination, game processing backend system 314 grows the reel by one row when transitioning from the first to the second game instance. The lookup tables 322 could be weighted such that at the first few initial game instances are more likely to select the smaller reel sizes (e.g., 5×7 or 5×8 reel configuration) and at the later game instances are more likely to be select the larger reel sizes (e.g., 5×13 or 5×14 reel configuration).

Game processing backend system 314 can randomly select which game instances out of a set of initial game instances will add substitution symbols. In one or more implementations, game processing backend system 314 performs an RNG pull from one or more lookup tables 322 that maps the RNG outcomes to whether certain game instances will add substitution symbols. The RNG pull to map whether the game instance will add substitution symbols are separate and independent from the RNG pulls for determining whether to increase the reel sizes. The lookup tables 322 could also be configured with a minimum number of game instances that will add substitution symbols. As an example, lookup tables 322 could be set to add substitution symbols to three of the five initial game instances. Based on the minimum number of game instances that will add substitution symbols and the RNG outcomes, game processing backend system 314 can determine that a subset of the initial game instances include adding substitution symbols.

As part of the reel growth, substitution determination operation, game processing backend system 314 may link the reel growth determination to whether substitution symbols will be added to each of the initial game instances or vice versa. For example, if game processing backend system 314 randomly determines that substitution symbols should not be added to a given game instances, game processing backend system 314 will not perform a separate random determination to establish whether reel growth occurs. In another example, game processing backend system 314 randomly determines that substitution symbols should be added, game processing backend system 314 performs a separate and independent RNG pull to determine whether to expand the reel area. Other implementations could have game processing backend system 314 that does not link the reel growth determination to when substitution symbols are added in a game instance or vice versa.

For each game instance designated to add substitution symbols, game processing backend system 314 determines which reels should receive the substitution symbols and the substitution symbol types for each reel. Table 5 shown below represents an example lookup table that maps the RNG outcome to determined reels with added substitution symbols and the substitution symbol types added to each reel.

TABLE 5

Example Lookup Table for Determining Substitution Symbols Added

| Count Value | Reels with Substitution Symbols/ Substitution Symbol Types |
|---|---|
| 50 | Reels in columns 1-5 have plain-substitution symbols added |
| 40 | Reels in columns 1-5 have plain-substitution symbols added |
| 30 | Reels in columns 1-5 have plain-substitution symbols added |
| 5 | Reels in columns 1, 2, 4, and 5 have plain-substitution symbols added; Reel in column 3 has credit-substitution symbols added |
| 1 | Reels in columns 1, 2, and 5 have plain-substitution symbols added; Reels in columns 3 and 4 have credit-substitution symbols added |

As shown in Table 5, for both the first and third table entries, each reel within a reel area will have a plain-substitution symbol added and assigned to one or more symbol window positions. In contrast, for the last table entry with a count value of one, reels in columns 3 and 4 of the reel area will have credit-substitution symbols added and assigned to one or more symbol window positions while reels in columns 1, 2, and 5 will have plain-substitution symbols added and assigned to one or more symbol window positions. Similar to Table 4, Table 5 may be only a portion of the lookup table 322 and could include other entries that cover the different combinations of placing substitution symbols for adding plain-substitution symbols and/or credit-substitution symbols across the different reels. Additionally, or alternatively, Table 5 could incorporate other parameters, such as which reel strips will include free game instance symbols (e.g., +1 spin symbol). Similar to Table 4, other implementations of Table 5 could include table entries that map RNG outcomes to other substitution symbol types.

After determining the type of substitution symbols to add to each reel, as part of the reel growth, substitution determination operation, game processing backend system 314 determines which symbol window positions will receive substitution symbols. In one or more implementations, game processing backend system 314 can directly or indirectly determine the number of substitution symbols to add to a given reel as previously described. Game processing backend system 314 may also account for a designated minimum number of substitution symbols that should be added to each reel. Other implementations, in contrast, may not account for a designated minimum number of substitution symbols that should be added to each reel. If the game processing backend system 314 determines that credit-substitution symbols will be added to one or more reels, as part of the reel growth, substitution determination operation, game processing backend system 314 utilizes one or more credit volatility lookup tables to randomly determine the credit values. Game processing backend system 314 also performs two payout operations, one payout for the payline value and another payout for the credit value for the credit-substitution symbol, each time a credit-substitution symbol is part of a payline.

Figure 11:
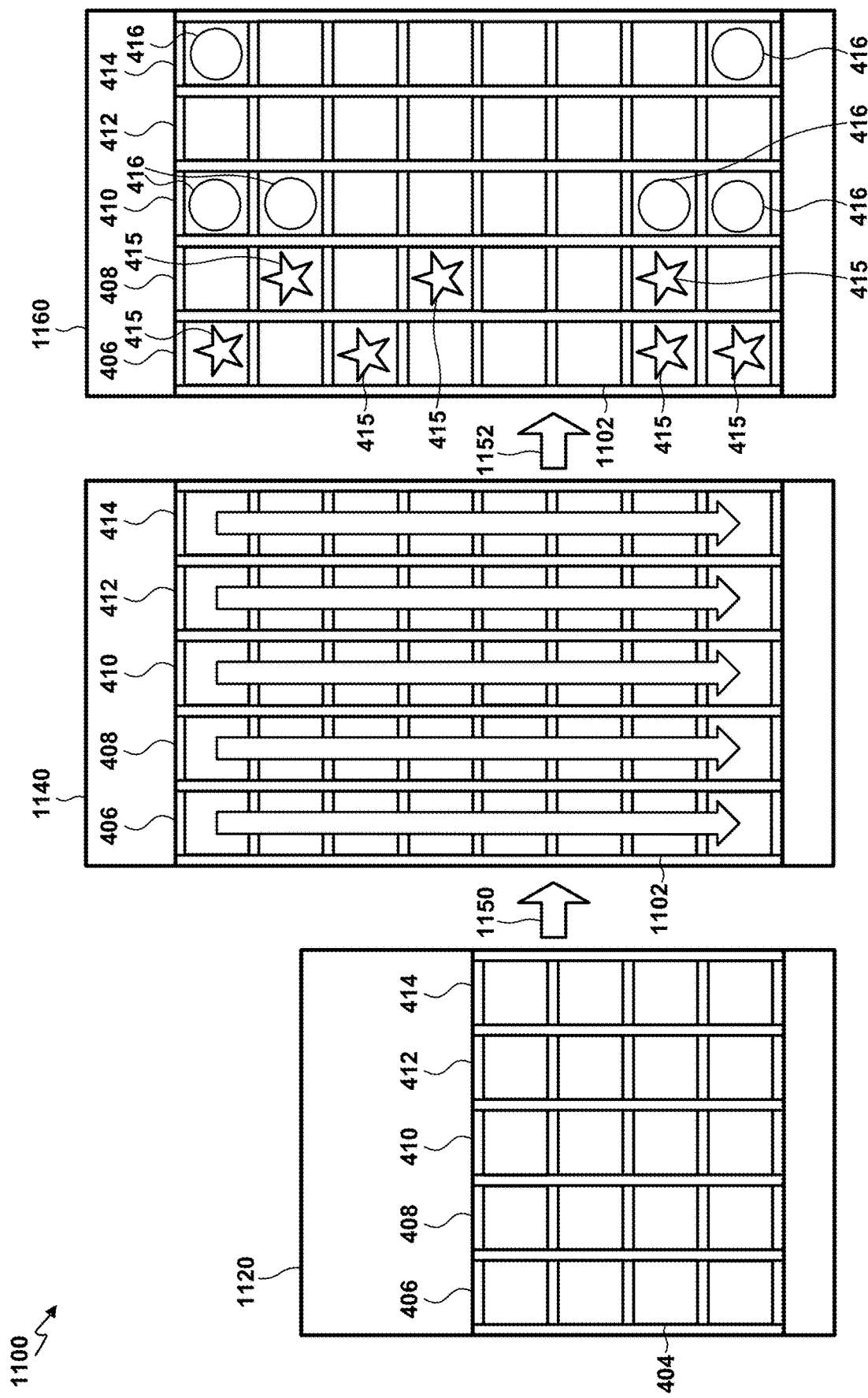
FIG. 11 is a diagram that depicts example general layouts of UIs related to presenting an add-substitution symbol supplemental feature that expands the reel size and adds substitution symbols to the expanded reel area.
Figure 12:
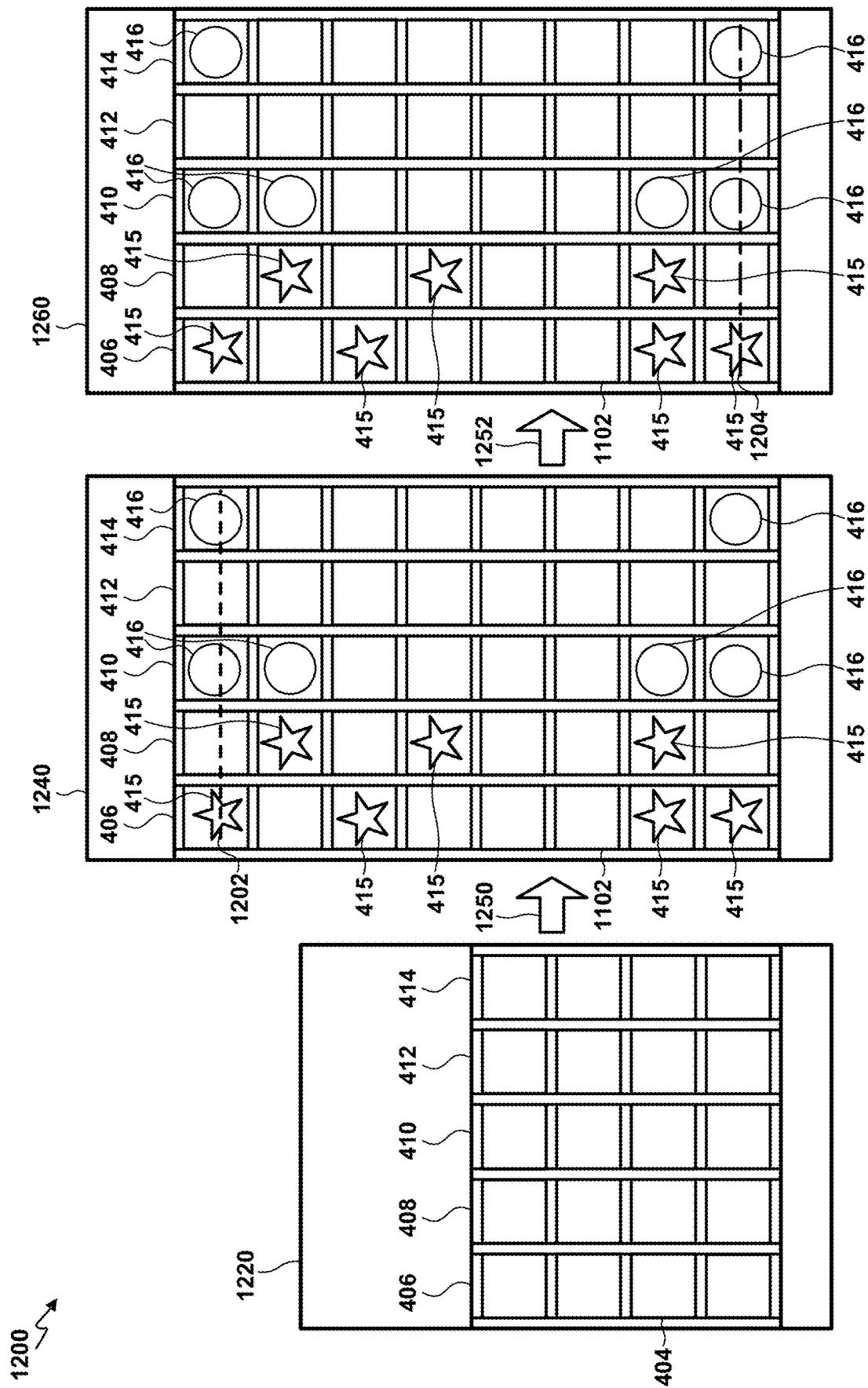
FIG. 12 is a diagram that depicts example general layouts of UIs related to presenting an add-substitution symbol supplemental feature that presents multiple paylines.
Figure 13:
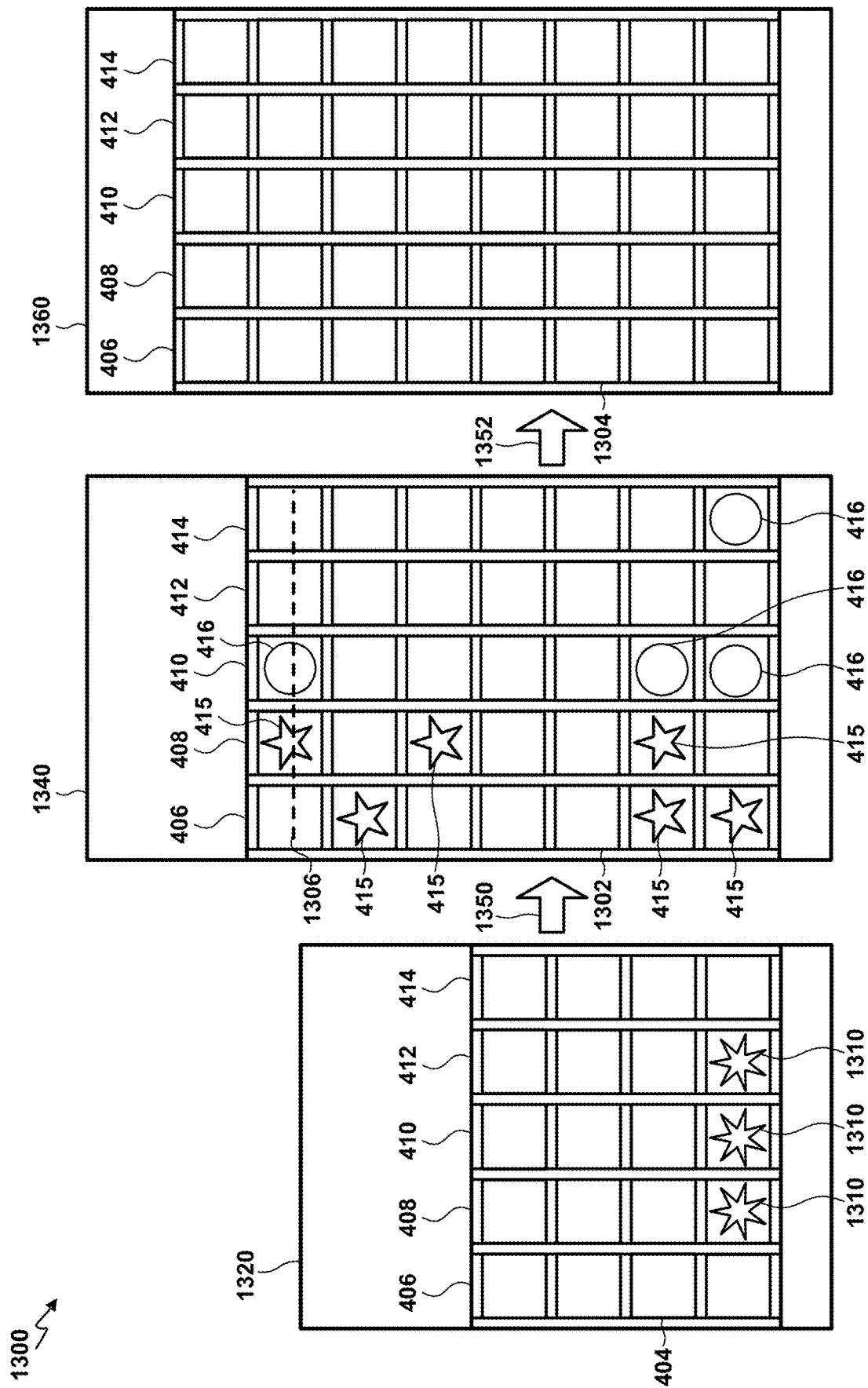
FIG. 13 is a diagram that depicts example general layouts of UIs related to presenting an add-substitution symbol supplemental feature over multiple game instances.

FIGS. 11-13 are diagrams that depict example general layouts of UIs related to presenting add-substitution symbol sequences 1100, 1200, and 1300. Specifically, the add-substitution symbol sequences 1100, 1200, and 1300 depict adding plain-substitution symbols 415 and credit-substitution symbols 416 to expanding reel areas 1102, 1302, and 1304. Other implementations of the add-substitution symbol sequences 1100, 1200, and 1300 could add other substitution symbol types, such as multiplier-substitution symbols, to reel areas 1102, 1302, and 1304 or other types of game areas. A gaming device can present add-substitution symbol sequences 1100, 1200, and 1300 when executing a game program. Using FIG. 2A as an example, when a gaming device 200 executes game program 206, the gaming device 200 displays bonus game play UIs 1140, 1160, 1240, 1260, 1340, and 1360 on primary game display 240 and/or secondary game display 242. Additionally, or alternatively, at least some or all portions of the bonus game play UIs 1140, 1160, 1240, 1260, 1340, and 1360 could be presented on mechanical reels and/or other types of mechanical and/or electro-mechanical components not shown in FIG. 2A.

In FIGS. 11-13, bonus game play UIs 1140, 1160, 1240, 1260, 1340, and 1360 include expanded reel areas 1102, 1302, and 1304. The expanded reel areas 1102, 1302, and 1304 include five vertical reels 406, 408, 410, 412, and 414 with symbol heights that are greater than the initial symbol heights of reel area 404. Similar to the UIs shown in FIGS. 4-6, bonus game play UIs 1140, 1160, 1240, 1260, 1340, and 1360 show blanks in certain symbol window positions. The blanks do not necessarily represent a blank symbol or no symbols landing on those symbol window positions. Instead, the blanks represent other symbol types that are not shown to facilitate ease of discussion.

With reference to FIG. 11, the add-substitution symbol sequence 1100 presents an add-substitution symbol supplemental feature that expands the reel size and adds substitution symbols to the expanded reel area 1102. Game play UI 1120 represents an initial UI that depicts reels 406, 408, 410, 412, and 414 in reel area 404 in a base game and/or supplemental game feature prior to triggering the add-substitution symbol supplemental feature. As shown in game play UI 1120, each reel 406, 408, 410, 412, and 414 are four symbols high to form a 5×4 reel configuration. Add-substitution symbol sequence 1100 transitions from game play UI 1120 to bonus game play UI 1140 by presenting an add-substitution symbol feature animation 1150. In FIG. 11, the add-substitution symbol feature animation 1150 performs a reel growth animation that transforms reel area 404 to reel area 1102.

Bonus game play UI 1140 represents a UI after triggering the add-substitution symbol feature and when the reels 406, 408, 410, 412, and 414 are spinning. When entering the add-substitution symbol feature, bonus game play UI 1140 presents reel area 1102 has expanded to a 5×8 reel configuration. For a given reel stop, reel area 1102 now presents a total of 40 symbol window positions, where each reel in reel area 1102 presents eight symbol window positions. In one or more implementations, after entering the add-substitution symbol feature, reels 406, 408, 410, 412, and 414 grow after initiating the game instances. Other implementations could have reels 406, 408, 410, 412, and 414 grow prior to spinning reels 406, 408, 410, 412, and 414 or grow after reels 406, 408, 410, 412, and 414 have stopped spinning.

The add-substitution symbol sequence 1100 subsequently presents a random based game outcome and add substitution symbol animation 1152 to transition from bonus game play UI 1140 to bonus game play UI 1160. Bonus game play UI 1160 presents a random based game outcome that has been modified with the addition of plain-substitution symbols 415 and credit-substitution symbols 416. The random based game outcome and add substitution symbol animation 1152 can add the substitution symbols while reels 406, 408, 410, 412, and 414 are spinning or after reels 406, 408, 410, 412, and 414 stop. Recall that plain-substitution symbols 415 and credit-substitution symbols 416 added to a symbol window position can replace and/or combine with the underlying symbols generated from the random based game outcome. Using FIG. 11 as an example, bonus game play UI 460 shows an added plain-substitution symbol 415 that could have replaced a royal symbol or picture symbol at the topmost symbol window position in the expanded reel 406. In another example, if the random based game outcome includes a feature triggering symbol (e.g., a scatter symbol) at the topmost symbol window position, the added plain-substitution symbol 415 represents a symbol with combined symbol attributes.

In FIG. 12, the add-substitution symbol sequence 1200 presents an add-substitution symbol supplemental feature that presents multiple paylines 1202 and 1204. The multiple paylines 1202 and 1204 occur after presenting a reel growth and adding substitution symbols to reels 406, 408, 410, 412, and 414. Similar to game play UI 1120 shown in FIG. 11, game play UI 1220 represents an initial UI that depicts reels 406, 408, 410, 412, and 414 in reel area 404 in a base game and/or supplemental game feature prior to triggering the add-substitution symbol supplemental feature. As shown in game play UI 1220, each reel 406, 408, 410, 412, and 414 are four symbols high to form a 5×4 reel configuration. Add-substitution symbol sequence 1200 transitions from game play UI 1220 to bonus game play UI 1240 by presenting an add-substitution symbol feature animation 1250.

The add-substitution symbol feature animation 1250 in FIG. 12 performs a reel growth animation that transforms reel area 404 to reel area 1102. From the reel growth animation reel area 1202 has grown to a 5×8 reel configuration. Moreover, add-substitution symbol feature animation 1250 presents a random based game outcome and adds substitution symbols. As shown in FIG. 12, bonus game play UI 1240 includes plain-substitution symbols 415 and credit-substitution symbols 416 that are overlaid onto the random based game outcome. In other words, bonus game play UI 1240 presents a random based game outcome that has been modified with the addition of plain-substitution symbols 415 and credit-substitution symbols 416. The add-substitution symbol feature animation 1250 can add the substitution symbols while reels 406, 408, 410, 412, and 414 are spinning or after reels 406, 408, 410, 412, and 414 stop.

The add-substitution symbol feature animation 1250 can also display a payout animation based on payline 1202. With reference to FIG. 12, the payout animation causes bonus game play UI 1240 to depict a horizontal payline 1202 that traverses through reels 406, 408, 410, 412, and 414. In one or more implementations, bonus game play UI 1240 presents two payout animations for payline 1202. One payout animation that awards the payline award determined for payline 1202 and another payout animation that awards the credit values of the credit-substitution symbols 416 that are part of payline 1202. In other implementations, bonus game play UI 1240 could have previously present one payout animation that awards all credit values of the credit-substitution symbols 416 that are part of payline (e.g., payline 1202). For example, bonus game play UI 1240 could present credit payouts for credit-substitution symbols placed on the reels (e.g., reel 410) that form payline 1202 and/or other paylines. Afterwards, bonus game play UI 1240 presents another payout animation that awards payouts for each payline (e.g., payline 1202).

Add-substitution symbol sequence 1200 transitions from bonus game play UI 1240 to bonus game play UI 1260 by presenting another payout animation 1252 for another payline 1204. Similar to payline 1202, bonus game play UI 1260 could also present two payout animations for payline 1204. One payout animation that awards the payline award determined for payline 1204 and another payout animation that awards the credit values of the credit-substitution symbols 416 that are part of payline 1204. Additionally, or alternatively, bonus game play UI 1260 could have previously present one payout animation that awards all credit values of the credit-substitution symbols 416 that are part of payline (e.g., payline 1204). Afterwards, bonus game play UI 1260 presents another payout animation that awards payouts for each payline (e.g., payline 1204).

FIG. 13 illustrates an add-substitution symbol sequence 1300 that exhibits an add-substitution symbol supplemental feature over multiple game instances. Similar to game play UI 1120 shown in FIG. 11, game play UI 1320 represents an initial UI that depicts reels 406, 408, 410, 412, and 414 in reel area 404 in a base game and/or supplemental game feature prior to triggering the add-substitution symbol supplemental feature. Reels 406, 408, 410, 412, and 414 present a random based game outcome that lands three feature triggering symbols 1310 (e.g., scatter symbols) that triggers the add-substitution symbol supplemental feature. Based on landing the three feature triggering symbols 1310, add-substitution symbol sequence 1300 transitions from game play UI 1320 to bonus game play UI 1340 through an add-substitution symbol feature animation 1350.

Bonus game play UI 1340 presents the random based game outcome for a first game instance of a set of initial game instances. As shown in FIG. 13, bonus game play UI 1340 presents the random based game outcome in a 5×7 reel configuration with plain-substitution symbols 415 and credit-substitution symbols 416. To transition to bonus game play UI 1340, add-substitution symbol feature animation 1350 displays a reel growth animation during the first game instance. In particular, add-substitution symbol feature animation 1350 transforms reel area 404, which has a 5×4 reel configuration, to reel area 1302, which has a 5×7 reel configuration. Furthermore, add-substitution symbol feature animation 1350 adds and overlays the substitution symbols while reels 406, 408, 410, 412, and 414 are spinning or after reels 406, 408, 410, 412, and 414 stop spinning.

Bonus game play UI 1340 also present a payout animation based on payline 1306. Similar to bonus game play UI 1240, bonus game play UI 1340 can present two payout animations for a given payline, such as payline 1306. One payout animation awards the payline award determined for payline 1306 and another payout animation awards the credit values of the credit-substitution symbols 416 that are part of payline 1306. Other implementations, bonus game play UI 1340 could skip the payout animation that awards the payline award and instead present payout animations that awards the credit values of the credit-substitution symbols 416 that are part of payline 1306.

Add-substitution symbol sequence 1300 transitions from bonus game play UI 1340 to bonus game play UI 1360 by presenting a game instance progression animation 1352. The game instance progression animation 1352 presents a subsequent game instance after ending the first game instance. As an example, after presenting bonus game play UI 1340, a gaming device receives a player input to initiate another game instance. Afterwards, game instance progression animation 1352 presents another reel growth animation without adding substitution symbols onto reels 406, 408, 410, 412, and 414. Recall that a gaming device can implement a reel growth, substitution determination operation that independently determines whether reel growth occurs and whether substitution symbols will be added to a given game instance. As a result, bonus game play UI 1360 includes a reel area 1304 that has expanded to a reel configuration of 5×8 even though no substitution symbols have been added to reel area 1304. Other implementations could link the reel growth animation when adding substitution symbols to symbol window positions. As an example, adding substitution symbols could randomly trigger and/or cause the expansion of reel area 1304.

Figure 14:
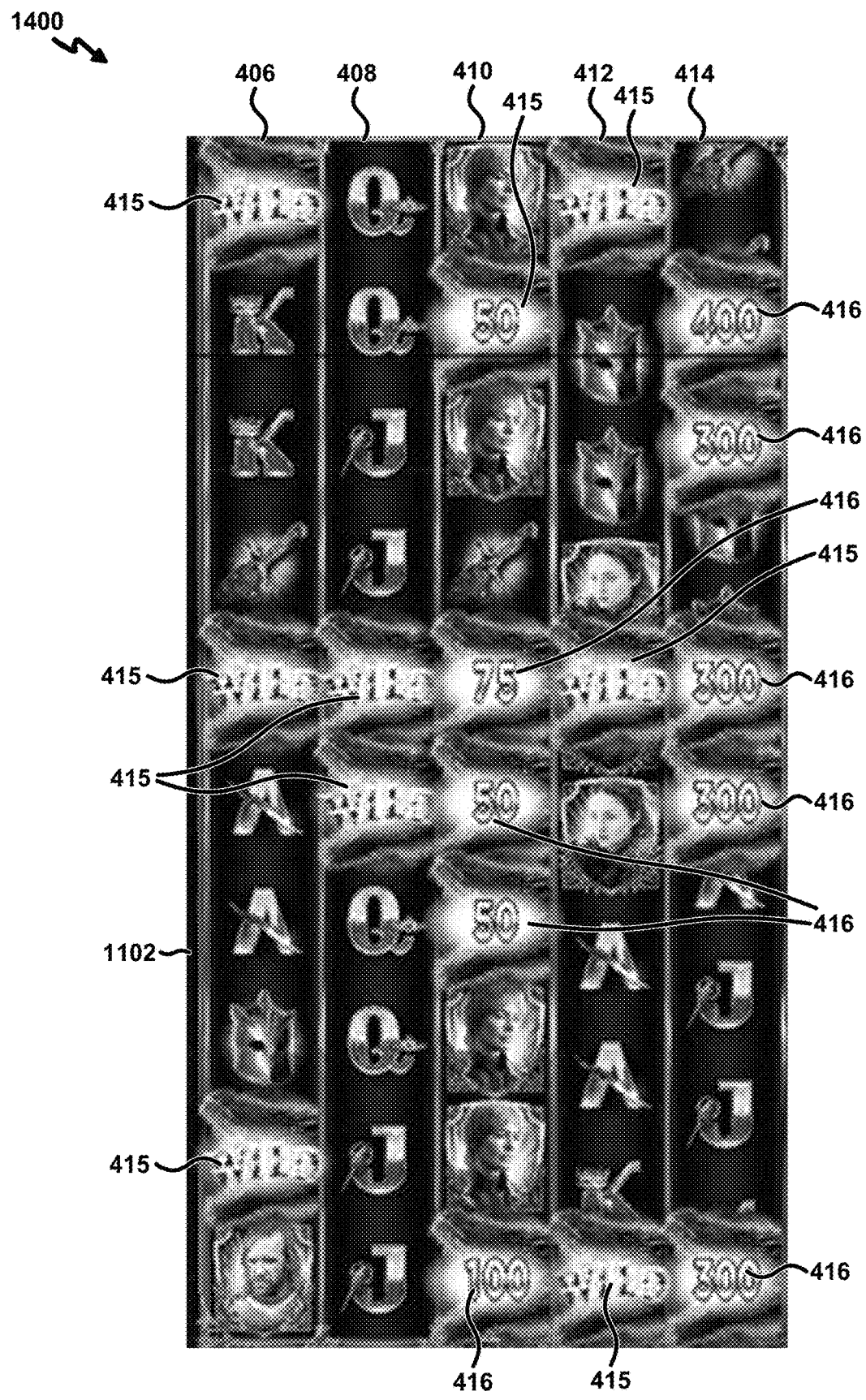
FIG. 14 is an example screenshot of a bonus game play UI that corresponds to a themed version of bonus game play UI shown in FIG. 11.

FIG. 14 is an example screenshot of a bonus game play UI 1400 that corresponds to a themed version of bonus game play UI 1160 shown in FIG. 11. The bonus game play UI 1400 has a substantially similar UI layout as bonus game play UI 1160, but with additional graphical elements associated with the game's theme. As shown in FIG. 14, the bonus game play UI 1400 displays an expanded reel area 1102 with a reel configuration of 5×10. Bonus game play UI 1400 also represents an UI that presents overlaying plain-substitution symbols 415 and credit-substitution symbols 416 over a random based game outcome.

Figure 15:
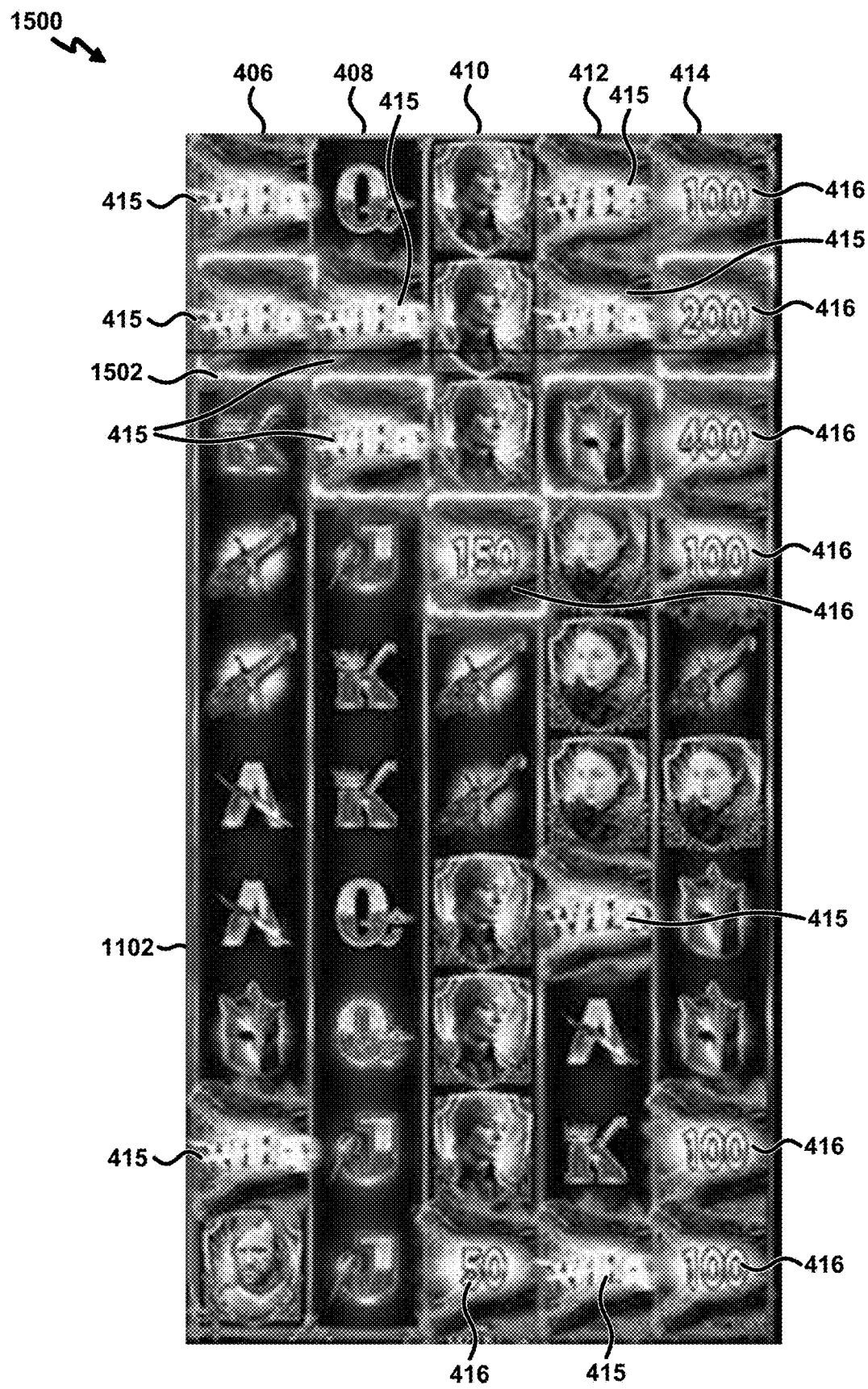
FIG. 15 is an example screenshot of a bonus game play UI that corresponds to a themed version of bonus game play UIs shown in FIG. 12.

FIG. 15 is an example screenshot of a bonus game play UI 1500 that corresponds to a themed version of bonus game play UIs 1240 and 1260 shown in FIG. 12. Bonus game play UI 1500 has a substantially similar UI layout as bonus game play UIs 1240 and 1260, but with additional graphical elements associated with the game's theme. As shown in FIG. 15, the bonus game play UI 1500 displays a payline 1502 that includes a credit-substitution symbol 416. Specifically, payline 1502 is v-shaped and includes a plain-wild substitution symbol 415 located on the second from the top symbol window position on reel 406, a plain-wild substitution symbol 415 located on the reel 408, a credit-substitution symbol 416 with a credit value of 150 on reel 410, a picture symbol on the reel 412, and a credit-substitution symbol 416 with a credit value of 200 on reel 414. The plain-wild substitution symbols 415, picture symbol, and credit-substitution symbols 416 within payline 1512 have highlighted win boxes around the symbols. For payline 1502, bonus game play UI 1500 presents two payout animations, one payout animation that pays all the credit values for credit-wild symbols that part of a payline (e.g., payline 1512) and another payout animation that payout each payline award determined for each payline (e.g., payline 1502).

Figure 16:
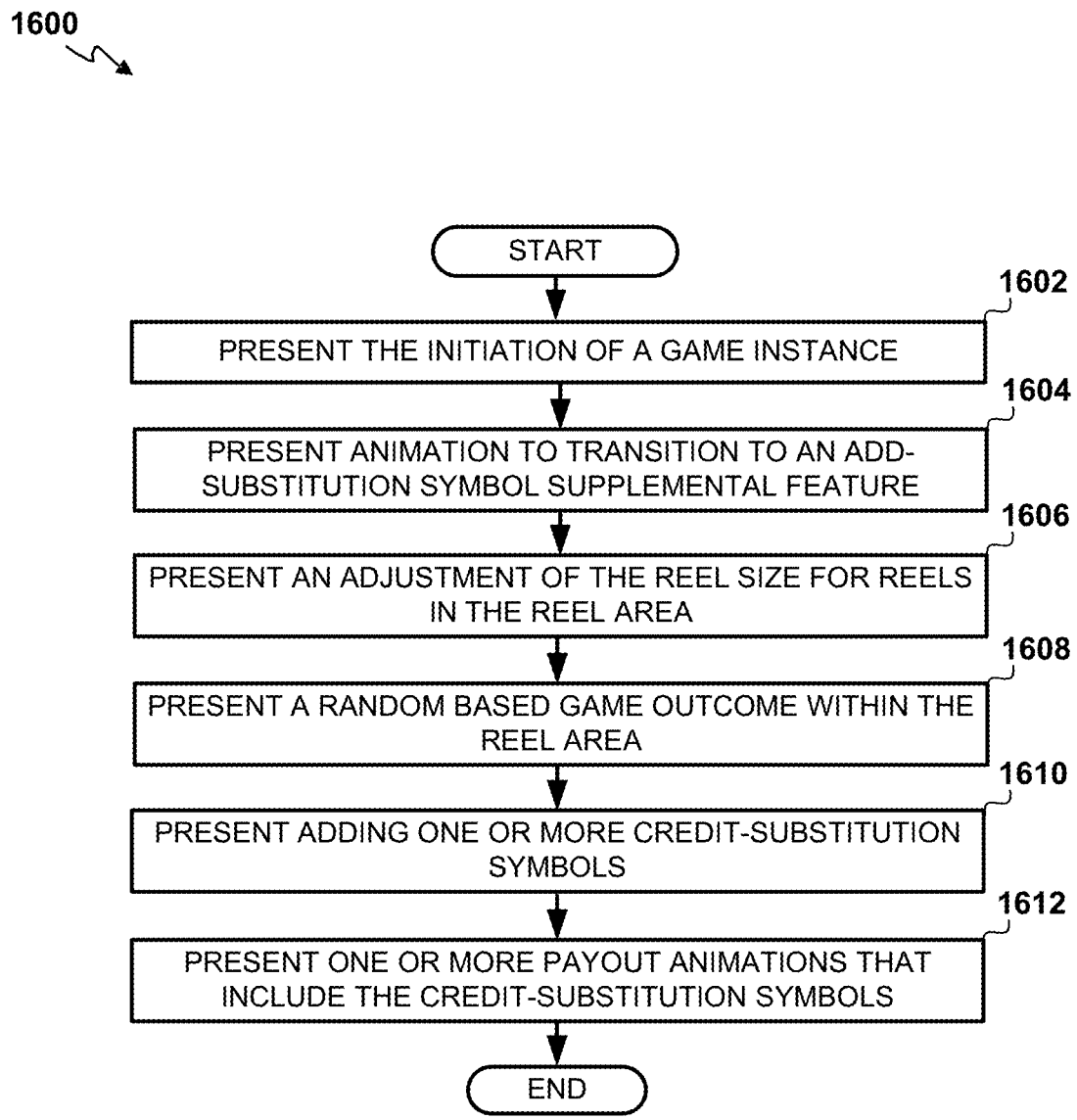
FIG. 16 depicts a flowchart illustrating a UI based operation for presenting a add-substitution symbol supplemental feature triggered from a base game and/or supplement game feature.

FIG. 16 depicts a flowchart illustrating a UI based operation 1600 for presenting a add-substitution symbol supplemental feature triggered from a base game and/or supplement game feature. In one or more implementations, the UI based operation 1600 may be implemented by a UI system 302 shown in FIG. 3 and/or displayed on the primary game display 240 and secondary game display 242 of a gaming device 200 shown in FIG. 2A. The UI based operation 1600 also corresponds to the game play UIs and bonus game play UIs shown in FIGS. 11-13. The use and discussion of FIG. 11 is only an example to facilitate explanation and is not intended to limit the disclosure to this specific example. In particular, UI based operation 1600 does not necessarily need to perform the sequence of blocks in the order as depicted in FIG. 16. As an example, UI based operation 1600 may implement block 1608 after implementing block 1610. Additionally, or alternatively, one or more of the blocks may be optional and may not be performed in all implementations of UI based operation 1600. For example, blocks 1606, 1610, and 1612 may be optional and may not be performed in all game instances of the add-substitution symbol supplemental feature.

UI based operation 1600 may start at block 1602 to present the initiation of a game instance. The game instance could be for a game instance in a base game and/or a supplemental feature game feature. UI based operation 1600 may then move to block 1604 to present an animation to transition to an add-substitution symbol supplemental feature. During the initiation of the game instance, UI based operation 1600 may transition from the base game and/or supplemental game feature to an add-substitution symbol supplemental feature. The add-substitution symbol supplemental feature may occur over a single game instance or multiple game instances.

At block 1606, UI based operation 1600 may present an adjustment of the reel size for reels in the reel area. For an add-substitution symbol supplemental feature that occurs over a single game instance, UI based operation 1600 shows an increase of the reel size for the single game instance. In an add-substitution symbol supplemental feature that occurs over multiple game instances, UI based operation 1600 may present an increase of the reel size for a subset of the multiple game instances. As an example, UI based operation 1600 does not increase the reel size in a first game instance in the add-substitution symbol supplemental feature but increase the reel size in one or more subsequent game instances. Alternatively, UI based operation 1600 increases the reel size in a first game instance in the add-substitution symbol supplemental feature but fails to increase the reel size in one or more subsequent game instances.

At block 1608, UI based operation 1600 presents a random based game outcome within the reel area. The reel area can include the initial reel area prior to triggering the add-substitution symbol supplemental feature and/or the expanded portion of the reel area. UI based operation 1600 may then move to block 1610 and present adding one or more credit-substitution symbols. The UI based operation 1600 can add the one or more credit-substitution symbols in the initial reel area and/or the expanded portion of the reel area. As an example, UI based operation 1600 may add credit-substitution symbols in the expanded portion of the area but not in the initial reel area. In another example, UI based operation 1600 may add credit-substitution symbols in the initial reel area and not the expanded portion of the reel area. UI based operation 1600 may add credit-substitution symbols while the reels are still spinning and before presenting the random based game outcome or after displaying the random based game outcome.

Afterwards, UI based operation 1600 may present one or more payout animations that include the credit-substitution symbols. Referring to FIG. 15, UI based operation 1600 can display a bonus game play UI 1500 that shows a payline 1502 with a credit-substitution symbol 416. For payline 1502, bonus game play UI 1500 presents two payout animations, one payout animation that pays out the payline award determined for payline 1502 and another payout animation that pays out the credit value of credit-substitution symbol 416. Alternatively, UI based operation 1600 could skip the payout animation that awards the payline award and instead present payout animations that awards the credit values of the credit-substitution symbols 416 that are part of payline 1502.

Figure 17:
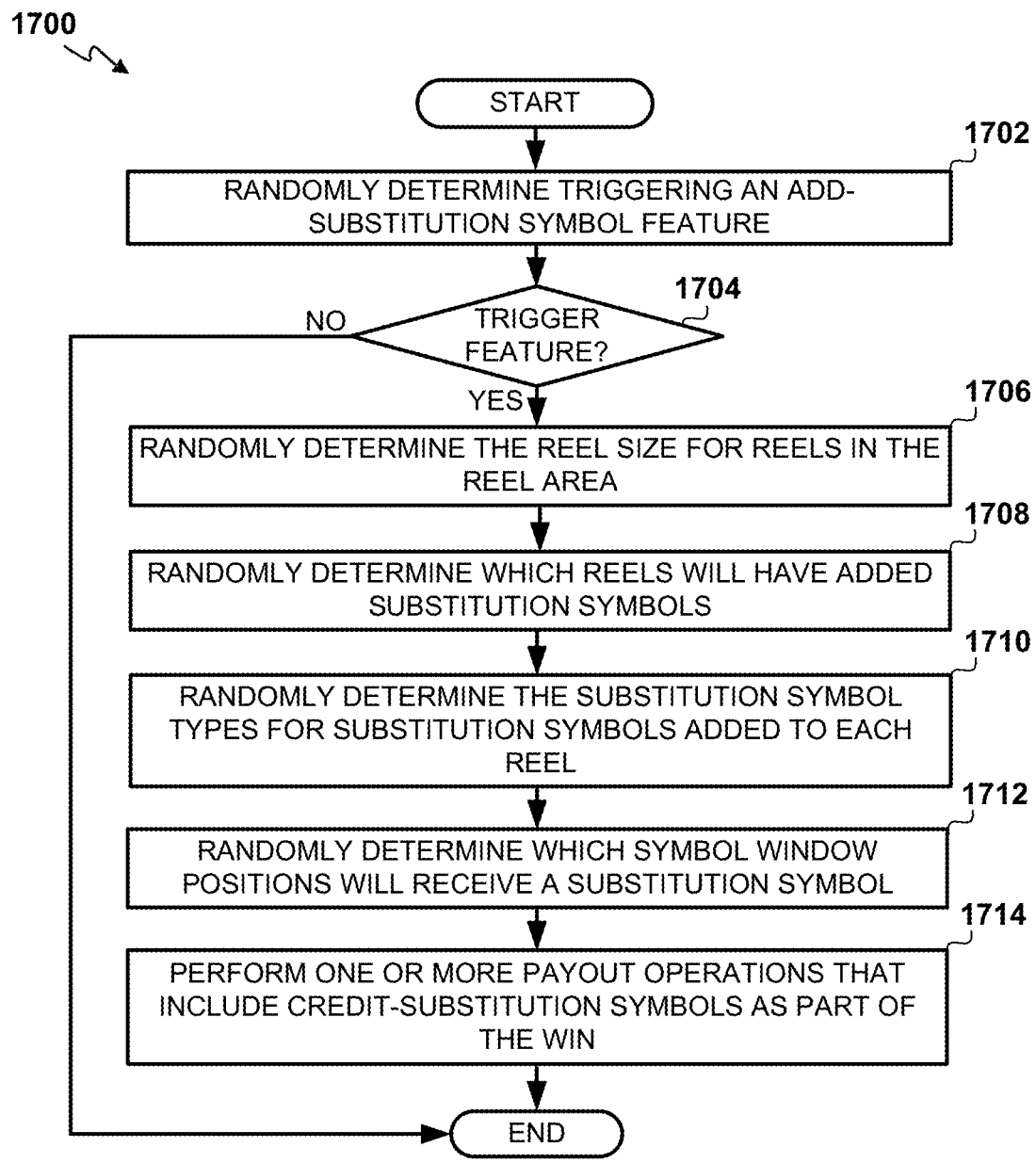
FIG. 17 depicts a flowchart illustrating backend-based operation for implementing one or more credit-substitution symbol mechanics over one or more game instances.

FIG. 17 depicts a flowchart illustrating backend-based operation 1700 for implementing one or more credit-substitution symbol mechanics over one or more game instances. For example, backend-based operation 1700 includes a reel growth, substitution determination operation that supports the UI based operation 1600 discussed with reference to FIG. 16. In one or more implementations, backend-based operation 1700 may be implemented by a game processing backend system 314 shown in FIG. 3 and/or by a game controller 202 shown in FIG. 2A. The use and discussion of FIG. 17 is only an example to facilitate explanation and is not intended to limit the disclosure to this specific example. In particular, backend-based operation 1700 does not necessarily need to perform the sequence of blocks in the order as depicted in FIG. 17. As an example, backend-based operation 1700 shown in FIG. 17 could perform blocks 1706, 1708, and 1710 simultaneously or in another sequence order, for example, blocks 1708 and 1710 are performed before block 1706. Other implementations of backend-based operation 1700 could directly determine the number of substitution symbols to add to a given reel by readjusting the sequence of blocks and/or not including one or more of the blocks.

Backend-based operation 1700 starts at block 1702 to randomly determine triggering an add-substitution symbol feature. With reference to FIG. 3, Table 2 previously discussed is an example lookup table backend-based operation 1700 may use to map the RNG outcome to a decision on whether to trigger the add-substitution symbol supplemental feature. Other implementations of backend-based operation 1700 could determine whether to trigger the add-substitution symbol feature based on a generated random based game outcome. Using FIG. 13 as an example, backend-based operation 1700 can generate a random based game outcome that lands three feature triggering symbols 1310 that triggers the add-substitution symbol feature. At block 1704, backend-based operation 1700 determines that if no add-substitution symbol feature triggers, backend-based operation 1700 ends. Otherwise, backend-based operation 1700 may move to block 1706.

To execute a reel growth, substitution determination operation, at block 1706, backend-based operation 1700 randomly determines the reel size for reels in the reel area. In one example, backend-based operation 1700 links the game evaluation of the determined expanded reel size to other game evaluations, such as determined reels with added substitution symbols and substitution symbol types for the added substitution symbols associated with the reel growth. Backend-based operation 1700 could link the reel size for reels to other game evaluations using a single lookup table. In another example, backend-based operation 1700 may not link the expanded reel size to other game evaluations by using separate RNG calls to lookup tables.

At block 1708, backend-based operation 1700 randomly determines which reels will have added substitution symbols. If backend-based operation 1700 executes the add-substitution symbol feature within a single game instance, backend-based operation 1700 may account for a designated minimum number of reels that will have at least one substitution symbol added to the reels. As an example, the lookup table to determine which reel will have added substitution symbols could be constructed to add at least one substitution symbol to two or more reels. If backend-based operation 1700 executes the add-substitution symbol feature spin over multiple game instance, backend-based operation 1700 may not utilize a designated minimum number of reels.

At block 1710, as part of the reel growth, substitution determination operation, backend-based operation 1700 randomly determines whether the substitution symbol types for substitution symbols added to each reel are plain-substitution symbols, credit-substitution symbols, and/or other types of substitution symbols. In one or more implementations, backend-based operation 1700 assigns a single substitution type for reels that will receive added substitution symbols. Backend-based operation 1700 then moves to block 1712 to randomly determine which symbol window positions will receive symbol window position.

At block 1712, in one or more implementations, backend-based operation 1700 indirectly determines the number of substitution symbols to add to a given reel by determining whether each symbol window position should receive substitution symbol. For an expanded reel area of 5×8, backend-based operation 1700 executes eight different RNG pulls where each RNG pull is for a different symbol window position in a given reel (e.g., reel in column 1). Game processing backend system 314 performs eight different RNG pulls because the reel configuration includes eight rows. Each RNG pull randomly determines whether to add a substitution symbol to a specific symbol window position. In another implementation, backend-based operation 1700 can first directly determine the number of substitution symbols to add to a reel, which is discussed in more detail with reference to FIG. 10.

At block 1714, backend-based operation 1700 performs one or more payout operations that include credit-substitution symbols as part of the win. To support the different payout animations for a given credit-substitution symbol, backend-based operation 1700 performs multiple payout operations when a credit-substitution symbol substitutes for another symbol type to form a payline. After determining that a credit-substitution symbol is part of a payline, backend-based operation 1700 performs a payout operation using a pay table to determine the payout amount for the payline. Using FIG. 3 as an example, one of the lookup tables 322 could be a pay table that determines payout for a variety of paylines for a game. In another payout operation, backend-based operation 1700 determines the credit value of the credit-substitution symbol that is part of the payline. The credit value of the credit-substitution symbol represents the payout amount for the payline in the second payout operation. In one or more implementations, backend-based operation 1700 can check whether the total payout amount exceeds a threshold payout amount that is based on a variety of game parameters, such as bet level and/or bet multiplier. For example, if backend-based operation 1700 executes the add-substitution symbol supplemental feature within a single spin, backend-based operation 1700 may perform this check. Alternatively, if backend-based operation 1700 executes the add-substitution symbol supplemental feature over multiple spins, backend-based operation 1700 may not perform this check or perform the check with a lower threshold payout amount than the single spin version of the add-substitution symbol supplemental feature.

Alternatives and Variations

Numerous embodiments are described in this disclosure and are presented for illustrative purposes only. The described embodiments are not, and are not intended to be, limiting in any sense. As an example, although the disclosure generally describes the credit-substitution symbol mechanics in a Class III reel or slot game context the disclosure is not limited to this type of game and/or gaming device. For example, other implementations and/or portions of the credit-substitution symbol mechanics may be implemented as a Class II gaming device. In particular, a gaming device may present game play UIs and bonus game UIs while implementing a Class II bingo game. Additionally, or alternatively, portions of the credit-substitution symbol mechanics can be utilized for other types of wagering game, such as keno, lottery, and pachinko.

The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A non-transitory computer-readable medium storing computer-executable instructions which, when executed by at least one processor, cause the at least one processor to:
   randomly trigger, using a random number generator, an add-substitution symbol feature in a game instance with an initial reel area;
   randomly determine, based on output from the random number generator and triggering of the add-substitution symbol feature, an expanded reel size for a plurality of reels to be displayed in an expanded reel area, wherein the expanded reel area is larger than the initial reel area;
   randomly determine, based on the output from the random number generator and triggering of the add-substitution symbol feature, that a substitution symbol is to be added to a symbol window position associated with a first reel of the plurality of reels;

randomly determine, using output from the random number generator, the symbol window position associated with the first reel and to which the substitution symbol is to be added;

randomly determine, based on the output from the random number generator, that the substitution symbol is a credit-substitution symbol associated with a specified credit value;

randomly determine, using output from the random number generator, that a second credit-substitution symbol is to be added at a second symbol window position associated with the first reel, wherein the credit-substitution symbol and the second credit-substitution symbol are added based on separate random number generator outcomes and the second credit-substitution symbol is associated with a second specified credit value;

determine that the credit-substitution symbol is part of a payline, wherein the credit-substitution symbol substitutes as a different symbol type when forming the payline;

indirectly determine that the number of credit-substitution symbols added to symbol window positions associated with the first reel based, at least in part, on counting the credit-substitution symbol and the second credit-substitution symbol satisfies a corresponding designated minimum number of substitution symbols that should be added to the symbol window positions associated with the first reel in the expanded reel area;

perform a first payout for the payline that pays out a payline award; and perform a second payout for the payline that pays out an amount that includes the specified credit value associated with the credit-substitution symbol and the second specified credit value associated with the second credit-substitution symbol.

2. The non-transitory computer-readable medium of claim 1, further storing additional computer-executable instructions which, when executed by the at least one processor, further cause the at least one processor to randomly determine, using output from the random number generator, the symbol window position associated with the first reel and to which the substitution symbol is to be added.

3. The non-transitory computer-readable medium of claim 2, further storing additional computer-executable instructions which, when executed by the at least one processor, further cause the at least one processor to randomly determine, using output from the random number generator, that a second credit-substitution symbol is to be added at a second symbol window position associated with the first reel, wherein the credit-substitution symbol and the second credit-substitution symbol are added based on separate random number generator outcomes.

4. The non-transitory computer-readable medium of claim 3, wherein the symbol window position is located in a portion of the expanded reel area that does not include the initial reel area and the second symbol window position is located in the initial reel area.

5. The non-transitory computer-readable medium of claim 3, further storing additional computer-executable instructions which, when executed by the at least one processor, further cause the at least one processor to indirectly determine the number of credit-substitution symbols added to symbol window positions associated with the first reel based, at least in part, on counting the credit-substitution symbol and the second credit-substitution symbol.

6. The non-transitory computer-readable medium of claim 1, wherein the corresponding designated minimum number of substitution symbols added to the symbol window positions associated with the first reel in the expanded reel area varies according to a size of the expanded reel area.

7. The non-transitory computer-readable medium of claim 1, further storing additional computer-executable instructions which, when executed by the at least one processor, further cause the at least one processor to:

determine that the number of credit-substitution symbols added to the symbol window positions associated with a given reel in the expanded reel area does not satisfy a corresponding designated minimum number of substitution symbols that should be added to symbol window positions associated with the given reel in the expanded reel area; and randomly redetermine whether the substitution symbol should be added to a symbol window position associated with the given reel responsive to determining that the designated minimum number of substitution symbols were not added to the symbol positions associated with the given reel in the expanded reel area.

8. A system comprising:

one or more displays, one or more processors, and one or more memory devices, the one or more memory devices storing computer-executable instructions which, when executed by the one or more processors, cause the one or more processors to:

randomly trigger, using a random number generator, an add-substitution symbol feature in a game instance with an initial reel area displayed on the one or more displays;

randomly determine, based on output from the random number generator and triggering of the add-substitution symbol feature, an expanded reel size for a plurality of reels to be displayed in an expanded reel area, wherein the expanded reel area is larger than the initial reel area;

randomly determine, based on the output from the random number generator and triggering of the add-substitution symbol feature, that a substitution symbol is to be added to a symbol window position associated with a first reel of the plurality of reels;

randomly determine, using output from the random number generator, the symbol window position associated with the first reel and to which the substitution symbol is to be added;

randomly determine, based on the output from the random number generator, that the substitution symbol is a credit-substitution symbol associated with a specified credit value;

randomly determine, using output from the random number generator, that a second credit-substitution symbol is to be added at a second symbol window position associated with the first reel, wherein the credit-substitution symbol and the second credit-substitution symbol are added based on separate random number generator outcomes and the second credit-substitution symbol is associated with a second specified credit value;

determine that the credit-substitution symbol is part of a payline, wherein the credit-substitution symbol substitutes as a different symbol type when forming the payline;

indirectly determine that the number of credit-substitution symbols added to symbol window positions associated with the first reel based, at least in part, on counting the credit-substitution symbol and the second credit-substitution symbol satisfies a corresponding designated minimum number of substitution symbols that should be added to the symbol window positions associated with the first reel in the expanded reel area;

perform a first payout for the payline that pays out a payline award; and perform a second payout for the payline that pays out an amount that includes the specified credit value associated with the credit-substitution symbol and the second specified credit value associated with the second credit-substitution symbol.

9. The system of claim 8, wherein the one or more memory devices further store additional computer-executable instructions which, when executed by the one or more processors, further cause the one or more processors to:
determine a number of credit-substitution symbols added to symbol window positions associated with a given reel;
determine whether the number of credit-substitution symbols added to the symbol window positions associated with the given reel satisfy a corresponding minimum number of substitution symbols that should be added to the symbol window positions associated with the given reel;
randomly redetermine, responsive to determining that the number of credit-substitution symbols added to the symbol window positions associated with the given reel does not satisfy a corresponding minimum number of substitution symbols that should be added to the symbol window positions associated with the given reel, whether a substitution symbol should be added to another symbol window position associated with the given reel.

10. The system of claim 9, wherein the one or more memory devices further store additional computer-executable instructions which, when executed by the one or more processors, further cause the one or more processors to determine the minimum number of substitution symbols that should be added to the symbol window positions associated with the given reel based on a size of the expanded reel area.

11. The system of claim 8, wherein the one or more memory devices further store additional computer-executable instructions which, when executed by the one or more processors, further cause the one or more processors to randomly determine, using output from the random number generator, the symbol window position associated with the first reel and to which the substitution symbol is to be added.

12. The system of claim 11, wherein the one or more memory devices further store additional computer-executable instructions which, when executed by the one or more processors, further cause the one or more processors to randomly determine, using output from the random number generator, that a second credit-substitution symbol is to be added at a second symbol window position associated with the first reel, wherein the credit-substitution symbol and the second credit-substitution symbol are added based on separate random number generator outcomes.

13. The system of claim 12, wherein the symbol window position is located in a portion of the expanded reel area that does not include the initial reel area and the second symbol window position is located in the initial reel area.

14. The system of claim 12, wherein the one or more memory devices further store additional computer-executable instructions which, when executed by the one or more processors, further cause the one or more processors to indirectly determine the number of credit-substitution symbols added to symbol window positions associated with the first reel based, at least in part, on counting the credit-substitution symbol and the second credit-substitution symbol.

15. A method comprising:
randomly triggering, using a random number generator and by one or more processors, an add-substitution symbol feature in a game instance with an initial reel area;
randomly determining, based on output from the random number generator, triggering of the add-substitution symbol feature, and by the one or more processors, an expanded reel size for a plurality of reels to be displayed in an expanded reel area, wherein the expanded reel area is larger than the initial reel area;
randomly determining, based on the output from the random number generator, triggering of the add-substitution symbol feature, and by the one or more processors, that a substitution symbol is to be added to a symbol window position associated with a first reel of the plurality of reels;
randomly determining, using output from the random number generator and by the one or more processors, the symbol window position associated with the first reel and to which the substitution symbol is to be added;
randomly determining, based on the output from the random number generator and by the one or more processors, that the substitution symbol is a credit-substitution symbol associated with a specified credit value;
randomly determining, using output from the random number generator and by the one or more processors, that a second credit-substitution symbol is to be added at a second symbol window position associated with the first reel, wherein the credit-substitution symbol and the second credit-substitution symbol are added based on separate random number generator outcomes and the second credit-substitution symbol is associated with a second specified credit value;
determining, by the one or more processors, that the credit-substitution symbol is part of a payline, wherein the credit-substitution symbol substitutes as a different symbol type when forming the payline;
indirectly determining, by the one or more processors, that the number of credit-substitution symbols added to symbol window positions associated with the first reel based, at least in part, on counting the credit-substitution symbol and the second credit-substitution symbol satisfies a corresponding designated minimum number of substitution symbols that should be added to the symbol window positions associated with the first reel in the expanded reel area;
causing, by the one or more processors, a first payout for the payline that pays out a payline award to be performed; and
causing, by the one or more processors, a second payout for the payline that pays out an amount that includes the specified credit value associated with the credit-substitution symbol and the second specified credit value associated with the second credit-substitution symbol to be performed.

16. The method of claim 15, wherein the corresponding designated minimum number of substitution symbols added to the symbol window positions associated with the first reel in the expanded reel area varies according to a size of the expanded reel area.

17. The method of claim 15, further comprising:
determining, by the one or more processors, that the number of credit-substitution symbols added to the symbol window positions associated with a given reel in the expanded reel area does not satisfy a corresponding designated minimum number of substitution symbols that should be added to symbol window positions associated with the given reel in the expanded reel area; and
randomly redetermining, by the one or more processors, whether the substitution symbol should be added to a symbol window position associated with the given reel responsive to determining that the designated minimum number of substitution symbols were not added to the symbol positions associated with the given reel in the expanded reel area.

18. The method of claim 15, further comprising randomly determining, using output from the random number generator and by the one or more processors, the symbol window position associated with the first reel and to which the substitution symbol is to be added.

19. The method of claim 18, further comprising randomly determining, using output from the random number generator and by the one or more processors, that a second credit-substitution symbol is to be added at a second symbol window position associated with the first reel, wherein the credit-substitution symbol and the second credit-substitution symbol are added based on separate random number generator outcomes.

20. The method of claim 19, wherein the symbol window position is located in a portion of the expanded reel area that does not include the initial reel area and the second symbol window position is located in the initial reel area.

* * * * *